(12) United States Patent
Hurm et al.

(10) Patent No.: US 10,154,683 B2
(45) Date of Patent: *Dec. 18, 2018

(54) HOME-STYLE MEAT PRODUCT AND METHOD OF PRODUCING SAME

(71) Applicant: Kraft Foods Group Brands LLC, Chicago, IL (US)

(72) Inventors: Matthew A. Hurm, Rockport, IN (US); Mark E. Malenke, Lakeville, MN (US); Amy Lynn Nehls, Pardeeville, WI (US); Muluken Tilahun, Lawrenceville, GA (US); Edward A. Kusmider, Woodridge, IL (US); Carrie K. Giannettino, Loveland, OH (US); Randy Glynn, Fall River, WI (US); Sarah C. Humke, Deerfield, IL (US); Lynda Cabrales, Naperville, IL (US)

(73) Assignee: Kraft Foods Group Brands LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/460,355

(22) Filed: Mar. 16, 2017

(65) Prior Publication Data

US 2017/0181457 A1 Jun. 29, 2017

Related U.S. Application Data

(63) Continuation of application No. 13/157,711, filed on Jun. 10, 2011, now Pat. No. 9,629,374, which is a (Continued)

(51) Int. Cl.
*A23L 13/60* (2016.01)
*A23B 4/052* (2006.01)
(Continued)

(52) U.S. Cl.
CPC .............. *A23L 13/60* (2016.08); *A23B 4/052* (2013.01); *A23L 13/03* (2016.08); *A23L 13/40* (2016.08);
(Continued)

(58) Field of Classification Search
CPC ......... A23L 13/60; A23L 13/03; A23L 13/428
See application file for complete search history.

(56) References Cited

U.S. PATENT DOCUMENTS 2,232,089 A 2/1941 Wool
2,252,733 A 8/1941 Ratchford
(Continued)

FOREIGN PATENT DOCUMENTS

CA 2140073 8/1995
EP 187550 7/1986
(Continued)

OTHER PUBLICATIONS

Canadian Intellectual Property Office; Canadian Office Action for CA2683521 dated Aug. 29, 2011; 2 pages.
(Continued)

*Primary Examiner* — Katherie D LeBlanc
(74) *Attorney, Agent, or Firm* — Fitch, Even, Tabin & Flannery LLP

(57) ABSTRACT

Methods and apparatus are disclosed for producing irregular pieces of meat from meat products. Further, a method of mass-producing a home-style meat product with an irregular appearance includes combining whole muscle meat with a mixture having a low-phosphate solution and/or a low-salt solution and cooking the combination to produce whole muscle meat logs. Once the whole muscle meat has been cooked, the meat may be pulled, shredded, or sliced on a variety of pulling, shredding, and slicing equipment to create a home-style meat product with an irregular appearance.

10 Claims, 8 Drawing Sheets

Related U.S. Application Data continuation-in-part of application No. 12/614,249, filed on Nov. 6, 2009, which is a continuation-in-part of application No. 12/267,356, filed on Nov. 7, 2008, now Pat. No. 9,675,089.

(60) Provisional application No. 61/453,034, filed on Mar. 15, 2011, provisional application No. 61/353,566, filed on Jun. 10, 2010.

(51) Int. Cl.
*A23L 13/00* (2016.01)
*A23L 13/40* (2016.01)
*A23L 13/70* (2016.01)

(52) U.S. Cl.
CPC ............ *A23L 13/428* (2016.08); *A23L 13/72* (2016.08); *A23V 2002/00* (2013.01); *Y02A 40/949* (2018.01)

(56) References Cited

U.S. PATENT DOCUMENTS

| | | | |
|---|---|---|---|
| 2,253,733 A | 8/1941 | Sheldon | |
| 3,327,622 A | 6/1967 | Lebovitz | |
| 3,521,688 A | 7/1970 | Urschel | |
| 3,615,704 A | 10/1971 | Pedersen | |
| 3,627,542 A | 12/1971 | Cohly | |
| 3,635,731 A | 1/1972 | Korten | |
| 3,853,999 A | 12/1974 | Kentor | |
| 3,857,310 A | 12/1974 | Tiby | |
| 4,041,822 A | 8/1977 | Gabel | |
| 4,210,677 A | 7/1980 | Huffman | |
| 4,258,068 A | 3/1981 | Huffman | |
| 4,463,027 A | 7/1984 | Chandler | |
| 4,484,374 A | 11/1984 | Herschberger | |
| 4,625,606 A | 12/1986 | Pinegar | |
| 4,680,186 A | 7/1987 | Sheehy | |
| 4,680,187 A | 7/1987 | Sheehy | |
| 4,728,524 A | 3/1988 | Gagliardi, Jr. | |
| 4,780,327 A | 10/1988 | Gardner-Carimi | |
| 4,781,934 A * | 11/1988 | Shimp ................... | A23B 4/02 426/264 |
| 4,800,094 A | 1/1989 | Freda | |
| 4,868,002 A | 9/1989 | Scaglione | |
| 4,921,714 A | 5/1990 | Matthews | |
| 4,946,085 A | 8/1990 | Nilsson | |
| 4,975,294 A | 12/1990 | Cohen | |
| 5,022,299 A | 6/1991 | Fischer | |
| 5,048,405 A | 9/1991 | Takahashi | |
| 5,053,237 A | 10/1991 | Hendricks | |
| 5,067,645 A | 11/1991 | Johnson | |
| 5,129,299 A | 7/1992 | Fischer | |
| 5,163,865 A | 11/1992 | Smith | |
| 5,249,494 A | 10/1993 | Borvitz | |
| 5,340,354 A | 8/1994 | Anderson | |
| 5,343,623 A | 9/1994 | Cole | |
| 5,346,711 A | 9/1994 | Gagliardi | |
| 5,370,573 A | 12/1994 | Warren | |
| 5,387,424 A | 2/1995 | Mendenhall | |
| 5,472,725 A | 12/1995 | Mendenhall | |
| 5,499,575 A | 3/1996 | Handel | |
| 5,534,279 A | 7/1996 | BoatellalRiera | |
| 5,567,466 A | 10/1996 | Dupont-Delhovren | |
| 5,694,824 A | 12/1997 | Jacko | |
| 5,775,986 A | 7/1998 | Law | |
| 5,896,801 A | 4/1999 | Jacko | |
| 5,927,175 A | 7/1999 | Franks | |
| 5,958,477 A | 9/1999 | Muromachi | |
| 5,965,191 A | 10/1999 | Katayama | |
| 5,992,284 A | 11/1999 | Bucks | |
| 6,017,570 A | 1/2000 | Gagliardi, Jr. | |
| 6,027,756 A | 2/2000 | Spratt | |
| 6,129,624 A | 10/2000 | Niklason | |
| 6,148,702 A | 11/2000 | Bucks | |
| 6,314,849 B1 | 11/2001 | Arrasmith | |
| 6,460,444 B2 | 10/2002 | Jacko | |
| 6,561,067 B2 | 5/2003 | Arrasmith | |
| 6,792,841 B2 | 9/2004 | Bucks | |
| 6,883,411 B2 | 4/2005 | Arrasmith | |
| 6,895,846 B2 | 5/2005 | Walker | |
| 6,920,813 B2 | 7/2005 | Bucks | |
| 6,952,989 B2 | 10/2005 | Bucks | |
| 7,000,518 B2 | 2/2006 | Bucks | |
| 7,178,440 B2 | 2/2007 | Bucks | |
| 7,263,923 B2 | 9/2007 | Urschel | |
| 9,629,374 B2 | 4/2017 | Hurm | |
| 9,675,089 B2 | 6/2017 | Sammel et al. | |
| 2001/0043962 A1 | 11/2001 | McFarland | |
| 2002/0048623 A1 | 4/2002 | Baarda | |
| 2002/0170991 A1 | 11/2002 | Prewitt | |
| 2005/0120844 A1 | 6/2005 | Weber | |
| 2005/0163912 A1 | 7/2005 | White | |
| 2005/0170056 A1 | 8/2005 | Weber | |
| 2005/0199115 A1 | 9/2005 | Veltrop | |
| 2006/0163792 A1 | 7/2006 | Bucks | |
| 2006/0266175 A1 | 11/2006 | McCormick | |
| 2006/0286273 A1 | 12/2006 | Rohwer | |
| 2007/0218107 A1 | 9/2007 | Schnur | |
| 2007/0227325 A1 | 10/2007 | Urschel | |
| 2007/0240550 A1 | 10/2007 | Jacko | |
| 2008/0022822 A1 | 1/2008 | Jacko | |
| 2008/0134850 A1 | 6/2008 | Bates | |
| 2008/0163792 A1 | 7/2008 | Seitz | |
| 2008/0190255 A1 | 8/2008 | McCracken | |
| 2009/0004353 A1 | 1/2009 | Topps | |
| 2009/0220652 A1 | 9/2009 | Gardner | |
| 2010/0119665 A1 | 5/2010 | Painter | |
| 2010/0119678 A1 | 5/2010 | Sammel | |
| 2011/0293817 A1 | 12/2011 | Hurm | |

FOREIGN PATENT DOCUMENTS

| | | |
|---|---|---|
| EP | 335889 | 10/1989 |
| EP | 0289652 | 3/1992 |
| EP | 677250 | 10/1995 |
| EP | 740311 | 11/1996 |
| EP | 743011 | 11/1996 |
| EP | 766927 | 4/1997 |
| EP | 1582103 | 10/2005 |
| GB | 2347845 | 9/2000 |
| GB | 2386820 | 10/2003 |
| JP | 6269262 | 9/1994 |
| JP | 8112080 | 5/1996 |
| JP | 2000060505 | 2/2000 |
| JP | 3266935 | 1/2002 |
| JP | 2003174858 | 6/2003 |
| WO | 1992019427 | 2/1992 |
| WO | 1995005092 | 1/1995 |
| WO | 1999047885 | 2/1999 |
| WO | 2001007215 | 1/2001 |
| WO | 2001052663 | 1/2001 |
| WO | 2005046359 | 1/2005 |
| WO | 2008006448 | 1/2008 |
| WO | 2009085022 | 1/2009 |
| WO | 2009120262 | 1/2009 |

OTHER PUBLICATIONS

DiversaCut 2110 Dicer Dimensional Drawing, Urschel Laboratories, Inc., Valparaiso, Indiana, Jun. 2007 (s.s.L1913A) 1 page.
Urschel Laboratories Incorporated; DiversaCut 2110 Dicer brochure; L1920 Aug. 2004; 4 pages.
DiversaCut 2110 Dicer brochure, Urschel Laboratories, Inc., Aug. 2004, 4 pages.
English translation of EP0289652.
EP0289652 B1 dated Mar. 4, 1992, Ludwig Scheid GmbH 9 pages.
Preos S.C., krajainice FAM, Cutting Principle, http://fam.pl/en/products/krajalnice fam/meat/yuran/cutting principle, accessed Jun. 1, 2011, 1 page.

(56) References Cited

OTHER PUBLICATIONS

Canadian Intellectual Property Office, Canadian Office Action for CA2742540 dated May 9, 2018; 4 pages.

* cited by examiner

400

HOME-STYLE MEAT PRODUCT AND METHOD OF PRODUCING SAME

CROSS-REFERENCE TO RELATED APPLICATIONS

This application is a continuation of U.S. application Ser. No. 13/157,711, filed Jun. 10, 2011 and now allowed, which is a continuation-in-part of U.S. application Ser. No. 12/614, 249, filed Nov. 6, 2009, which is a continuation-in-part of U.S. application Ser. No. 12/267,356, filed Nov. 7, 2008, which are incorporated by reference herein in their entirety. U.S. application Ser. No. 13/157,711, also claims the benefit of U.S. Provisional Application No. 61/453,034, filed Mar. 15, 2011, and U.S. Provisional Application No. 61/353,566, filed Jun. 10, 2010, which are incorporated by reference herein in their entirety.

FIELD

This disclosure relates generally to a method for producing a home-style meat product and, more specifically, to a method for mass producing a home-style meat product such as a sliced, pulled, or shredded meat product.

BACKGROUND

Processing systems for various food products like vegetables, fruits, and meat products are known. When focused on meat products, the systems in the art are typically directed to producing uniform slices and cuts. In fact, the art exhibits a systematic progression to achieve greater and greater uniformity. This is true whether the system is producing a diced product, where the squareness of the final product is the desired trait, or producing a sliced product, where uniformity of thickness, size, and shape is preferred. These systems produce a final meat product that is packaged and presented to the consumer with each piece looking generally the same as the next.

An important factor in a consumer's selection is the visual appearance of the cut food product. If put off by the uniformity normally on display by mass produced meat products, consumers may instead desire "home-style" products with an appearance similar to meat cut from a home cooked turkey or ham. Meat products that are irregular in shape and size can solve this need without requiring the consumer to spend hours preparing a home cooked meat product. However, the known processing systems for producing slices of meat with irregular shapes and sizes do not provide a sufficient solution to this problem.

When applied on a mass scale, manual cutting and slicing is simply not cost effective, requiring tedious processing and excessive manual labor. Accordingly, there have been other attempts at producing irregular shaped and sized slices. One method known in the art involves using molds to shape the meat in casing to give them an irregular shape. These molded slices of meat are then put through a traditional cutting or slicing system, which produces a product where consecutive slices appear different from one another, but also with a pattern of repeating shapes, uniform thickness and size. Another method uses a technique of skimming the bottom of a cooked meat product to produce slices with a roughed up appearance. A final method to produce slices with an irregular shape and size involves simply taking slices from several different sticks of meat and packaging them together. However, all of these techniques still result in slices of meat that have an overall uniform appearance and/or a lack of a cost-effective technique.

DETAILED DESCRIPTION

Figure 1:
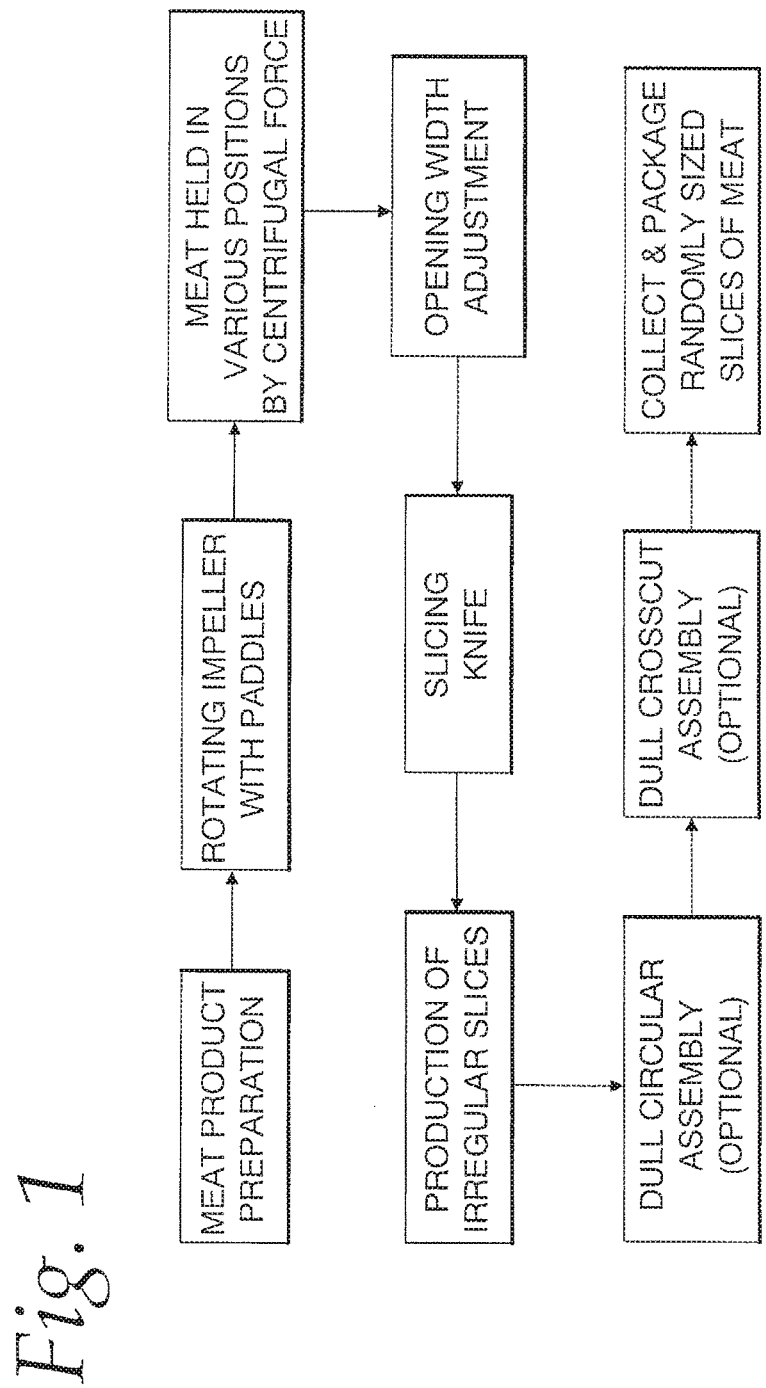
FIG. 1 is a flow diagram of a method for producing meat slices of irregular shape and size.

In accordance with one aspect, a method is provided for producing a sliced meat product that closely resembles sliced meat produced using manual culinary techniques. The method includes combining boneless whole muscle meat with a mixture having a low phosphate concentration. The mixture has a phosphate concentration, such as approximately 1-2%, which is a significant decrease from conventional solutions having a phosphate concentration of about 3-3.5%. A low phosphate mixture produces a lower bind between the individual muscle pieces during thermal processing or cooking, which forms a meat product that is more easily separated prior to slicing. In one approach, the mixture having a low phosphate concentration is injected using a conventional pickle injector and/or tumbled with the whole muscle meat to combine the mixture and the whole muscle meat with a minimal amount of mechanical work being done to the whole muscle meat. Due to the low-phosphate level of the mixture and the limited amount of working done to the meat prior to cooking, the binding between the individual muscle pieces is much looser than a conventional product. In yet another aspect, the mixture may have a low phosphate and a low salt concentration.

In another aspect, the method further includes stuffing the combined boneless whole muscle meat and the mixture having the low phosphate concentration into a casing and cooking the casing such that individual pieces of the whole muscle meat are bound together inside the casing during cooking. Next, the cooked boneless whole muscle meat is worked to loosen the binding between the individual whole muscle meat pieces. The working may be performed prior to slicing and includes pressing, puncturing, massaging, kneading, pounding, tearing, or pulling. By working the meat to loosen the binding, the individual muscle pieces separate from one another such that when they undergo the slicing operation, they have a high degree of irregularity. In another approach, the method includes working the cooked boneless whole muscle meat after slicing. Working the cooked and sliced whole muscle meat, such as by tumbling or augering, produces movement of the meat slices to give the meat slices an irregular appearance.

In accordance with another aspect, a method is provided for producing a pulled, shredded, or sliced meat product having an appearance that closely resembles pulled, shredded, or sliced meat produced using manual culinary techniques. The method includes combining a whole muscle meat with a solution having a low salt content, such as by using a conventional pickle injection process to inject the solution into the whole muscle meat. The solution has a salt concentration in the range of approximately 5% to approximately 15%, which is a significant decrease in the amount of salt used in prior approaches. The low-salt solution is a relatively poor water binder that encourages water loss through evaporation and expulsion during cooking in a manner similar to home-style cooking. The combined whole muscle meat and solution are mixed in a manner to maintain muscle fiber integrity and preserve the natural appearance and irregularity of the whole muscle meat. The mixed whole muscle meat is cured and loosely stuffed into a casing so as to preserve an irregular composition of the whole muscle meat within the casing. The loose stuffing also creates void space within the casing to permit moisture expulsion and keep the whole muscle meat pieces from gluing together during thermal processing.

The stuffed casings may be cooked to break down the collagen and connective tissue holding the muscle fibers together and optionally smoked to deliver a high quality flavor. Cooking the stuffed casings at higher temperatures than prior approaches further encourages water loss, breaks down collagen and connective tissue, and produces a desired texture. The cooked whole muscle meat may be cooled and pulled, shredded, or sliced at reduced temperatures. In this manner, the method provides a loosely bound cooked whole muscle meat that may be stored at refrigerated temperatures until subsequent pulling, shredding, or slicing as desired for a particular meat product. Further, mixing the whole muscle meat and low salt solution to achieve minimal protein extraction and loosely stuffing the whole muscle meat into casings loosely binds the whole muscle meat. In another aspect, the mixture may include a low salt and a low phosphate concentration. The loosely bound muscle meat may then be readily pulled, shredded, or sliced despite being cooled and stored at refrigerated temperatures.

Figure 2:
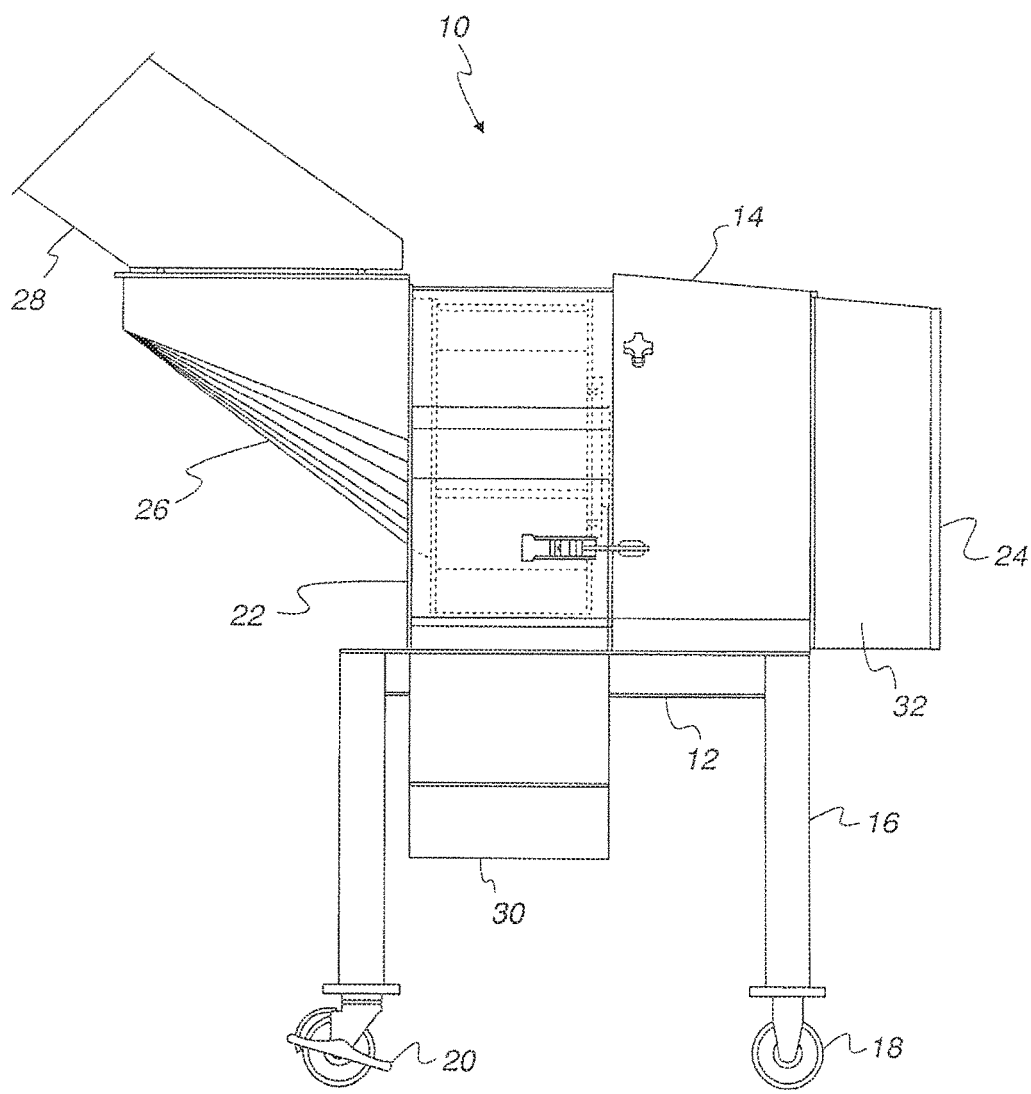
FIG. 2 is a side elevation view of an apparatus for producing meat slices of irregular shape and size.
Figure 3:
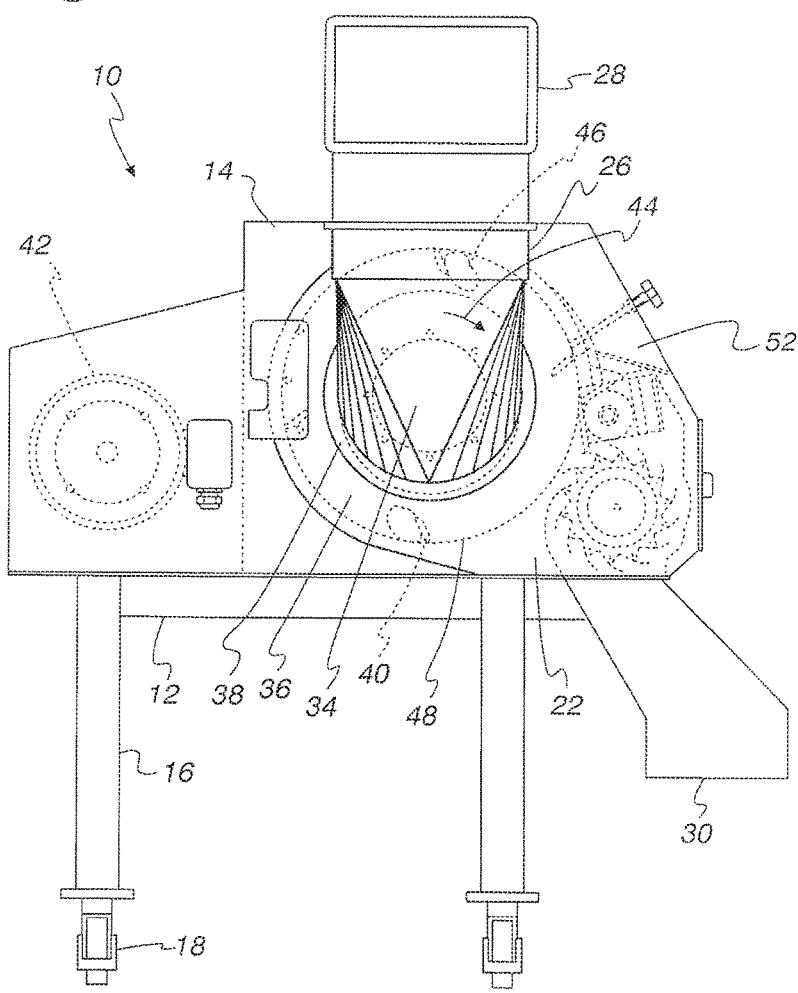
FIG. 3 is a front elevation view of an apparatus shown in FIG. 2.
Figure 4:
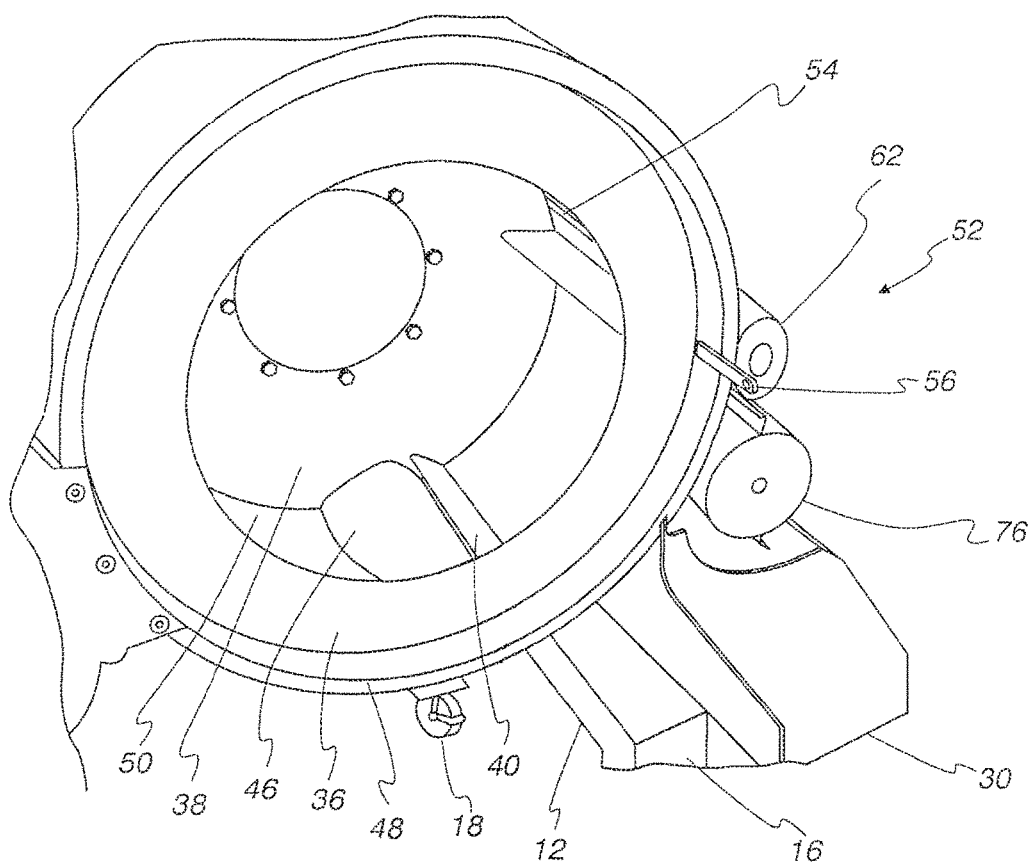
FIG. 4 is a perspective view of the apparatus of FIG. 2 with the optional front panel open.

With reference to the drawings, a method and processing machine is provided for use in producing irregularly shaped and sized food products and, in particular, for use in producing irregularly shaped and sized meat slices. The processing machine is generally referred to by reference numeral 10 in FIGS. 2-4.

With reference to FIGS. 2-5, the rotary processing machine 10 comprises a support frame 12 and a housing 14. Prepared meat products 46 are fed into a rotary impeller 34, which is rotatably attached in the housing 14. The impeller 34 comprises a plurality of equally spaced paddles 40 and is encircled by a stationary cylinder 48. A motor 42 drives the rotation of the impeller 34. As the impeller 34 rotates, the paddles 40 catch the meat product 46 and carry it along an inner surface 50 of the stationary cylinder 48. The stationary cylinder 48 includes an opening 54. On one side of the opening 54, a slicing knife 56 is attached. As the impeller 34 drives the meat product 46 around the inner surface 50 of the stationary cylinder 48, the meat product 46 approaches the opening 54 and impacts the slicing knife 56. The meat products 46 are able to tumble in the impeller so that different sides are engaged by the slicing knife 56. This process produces meat slices 46a of irregular shape and size.

The rotary processing machine 10 can further include a circular knife assembly 62. The circular knife assembly 62 is positioned proximal to the opening 54, but downstream of the slicing knife 56. The circular knife assembly 62 is oriented generally parallel with the slicing knife 56. The circular knife assembly 62 may then further reduce the size of the meat product 46, while still producing meat slices 46a of irregular shape and size. The circular knife assembly 62 would have at least one circular, rotating cutting blade 68. The blade 68 preferably is dulled to produce rough cutting edges.

The rotary processing machine 10 can further include a cross cut knife assembly 76. The cross cut knife assembly 76 is positioned proximal to and downstream of the circular knife assembly 62 and the slicing knife 56. The cross cut knife assembly 76 is oriented generally parallel with the slicing knife 56. The cross cut knife assembly 76 may then further reduce the size of the meat product 46, while still producing meat slices 46a of irregular shape and size. The cross cut knife assembly 76 would have at least one cross cut blade 78. The blade 78 preferably is dulled to produce rough cutting edges.

The rotary processing machine 10 can be made to be highly space efficient. For example, in one embodiment, the rotary processing machine 10 may have a height in the range of 50 inches to 72 inches, and preferably in the range of 54 inches to 69 inches. In addition, the rotary processing machine 10 may weigh in the range of 1,400 pounds to 1,600 pounds, and preferably about 1,500 pounds.

The frame 12 provides the support for the rotary processing machine 10. In one embodiment, the frame 12 may have a length in the range of 26 inches to 38 inches and a width in the range of 25 inches to 37 inches. In the preferred embodiment, the frame 12 has a length of about 32 inches and a width of about 31 inches. These embodiments are designed to utilize a relatively small area while still allowing the rotary processing machine 10 to operate in a high-speed commercial environment.

The small area allows the rotary processing machine 10 to seamlessly integrate with existing operations. The frame 12 may further comprise numerous legs 16. In the preferred embodiment, each of the legs 16 has casters 18 at their terminal end to allow for greater mobility of the rotary processing machine 10. At least one caster 18 preferably has a locking mechanism 20 that an operator can engage to prevent the rotary processing machine 10 from moving when movement is not desired.

The frame 12 is attached to and supports the housing 14. In one embodiment, the housing 14 may have a length in the range of 37 inches to 67 inches, and preferably in the range of 47 inches to 62 inches, and more preferably about 57 inches. The housing 14 may enclose any or all of the motor 42, the impeller 34, the stationary cylinder 48, the knife assembly 52, and an electrical component box 32. The housing 14 may also include access to the devices enclosed within it. In one embodiment, this access comprises a front panel 22. The front panel 22 may be hinged to provide the operator access to the impeller 34, the stationary cylinder 48 and the knife assembly 52. This feature provides the user with easy access to these devices as needed, for example, for maintenance or cleaning. In another embodiment, this access may include a back panel 24. The back panel 24 may be hinged to provide the operator access to at least the electrical component box 32, as needed.

The housing 14 includes a hopper 26. The hopper 26 is positioned to receive the prepared meat product 46 and feed it into the stationary cylinder 48. The hopper 26 is positioned adjacent to the stationary cylinder 48, and preferably centered with the stationary cylinder 48. In the preferred embodiment, the hopper 26 has an opening directed upwards for loading of the prepared meat product 46 and urging of the prepared meat product 46 into the stationary cylinder 48 by gravitational force. The diameter of the hopper 26 where it provides access to the stationary cylinder 48 may be in the range of 13.5 inches to 14.8 inches, and preferably about 13.5 inches. The hopper 26 may preferably be positioned on the front panel 22 to provide access to the stationary cylinder 48 and the impeller 34 as needed, for example, for maintenance or cleaning.

In the preferred embodiment, the housing 14 also comprises a feeder chute 28. The feeder chute 28 is attached to the hopper 26 to provide an extended and more covered access route for the prepared meat product to reach the stationary cylinder 48. The access opening of the feeder chute 28 may be vertically aligned or preferably facing generally upwards. In one embodiment, the feeder chute 28 is generally circular with an opening generally equal to that of the hopper 26 at its distal end where the chute 28 meets the hopper 26. Alternatively, in the preferred embodiment, the feeder chute 28 starts with a generally square opening, preferably about 13.5 inches on each side, and ends with an opening generally equal to that of the hopper 26 at its distal end where the chute 28 meets the hopper 26.

The housing 14 also may include a discharge chute 30. The discharge chute 30 is positioned below the knife assembly 52 to direct the discharge of the meat slices 46a from the rotary processing machine 10. The discharge chute 30 may be downward facing. The distal end of the discharge chute 30 may be in the range of 10 inches to 20 inches above the floor, and preferably about 15 inches. This preferable height from the floor provides the discharge chute 30 with a sufficient height to accommodate larger slices produced by the processing machine 10. It may be of a generally rectangular shape with a width equal to or larger than the width of the stationary cylinder 48, and preferably in the range of 13 inches to 15 inches, and more preferably about 13.7 inches. The length of the distal end of the discharge chute 30 may be in the range of 5 inches to 15 inches, and preferably about 10 inches. In one embodiment, the discharge chute 30 is attached to the housing 14 directly below the knife assembly 52 and angles away from the rotary processing machine 10, so that the distal end of the discharge chute 30 is spaced from the frame 12 in the range of about 4 inches to 12 inches, and preferably in the range of 8 inches to 9 inches. In addition, the discharge chute 30 preferably does not contain any obstructions in order to provide an easier discharge path for the meat slices 46a.

The impeller 34 includes a pair of rotating end discs 36, 38 interconnected by the paddles 40. The paddles 40 are equally spaced around the interior circumference of the end discs 36, 38. The impeller 34 is rotatably attached in the housing 14. The paddles 40 are preferably attached perpendicular to the end discs 36, 38. The paddles may be orientated generally radially, or alternatively, they may be angled toward the direction of rotation of the impeller 34. This angle can be between 0 and 55 degrees from radial in the direction of rotation of the impeller 34, and preferably about 30 degrees. The paddles 40 may preferably start at the outer edge of the impeller 34 or, alternatively, start in a range up to 1 inch from the edge. The paddles 40 have a length in the range of 3 inches to 6 inches, and preferably 4 to 5 inches. This preferable length allows the meat product 46 to tumble and present different oriented slicing surfaces to the slicing knife 56. In one embodiment, the impeller 34 has between two and six paddles 40, and preferably between three and five paddles 40. In the most preferred embodiment, the impeller 34 has four paddles 40.

The motor 42 drives the rotation of the impeller 34, such as in a direction indicated by the arrow 44. The motor 42 can operate at any feasible hertz level, and preferably in a range from 60 to 75 hertz, and more preferably 75 hertz. In addition, the motor 42 can operate at any feasible horsepower, and preferably at 10 horsepower. The motor 42 may preferably be supplied voltage across the line or, alternatively, by a variable frequency drive.

As the motor 42 causes the impeller 34 to rotate, the paddles 40 contact the prepared meat product 46 and cause it to rotate along with the impeller 34 in the direction of the arrow 44. As a result of the rotation, centrifugal force presses the prepared meat product 46 against the inner surface 50 of the stationary cylinder 48. The paddles 40, in turn, drive the prepared food product 46 around the inner surface 50 of the stationary cylinder 48. Because the rotary cutting machine 10 does not restrain or control the position of the prepared meat product 46 beyond the application of centrifugal force, the prepared food product 46 can tumble and fall within the impeller 34. As a result of this process, the prepared meat product 46 is pressed against the inner surface 50 of the stationary cylinder 48 in random and different orientations as it is driven by the paddles 40 of the impeller 34.

The degree of random and different orientations can be increased depending upon the amount of meat product 46 present in the impeller 34. For example, having more meat products 46 in the impeller 34 than the number of paddles 40 can advantageously result in the excess meat products 46 accumulating in a lower region of the cylinder 48. After a meat product 46 has been sliced, the meat product 46 can continue to rotated toward the lower region where the accumulated meat products 46 can cause the just-sliced meat product 46 to become dislodged from adjacent the paddle 40. Another meat product 46 can then take the place of the just-sliced meat product 46. When the just-sliced meat product 46 is subsequently advanced by the same of a different paddle 40, it can be in a different orientation than if it had continued to rotate by the same paddle 40, and thereby the next time it is sliced, a differently shaped slice can be cut.

Figure 5:
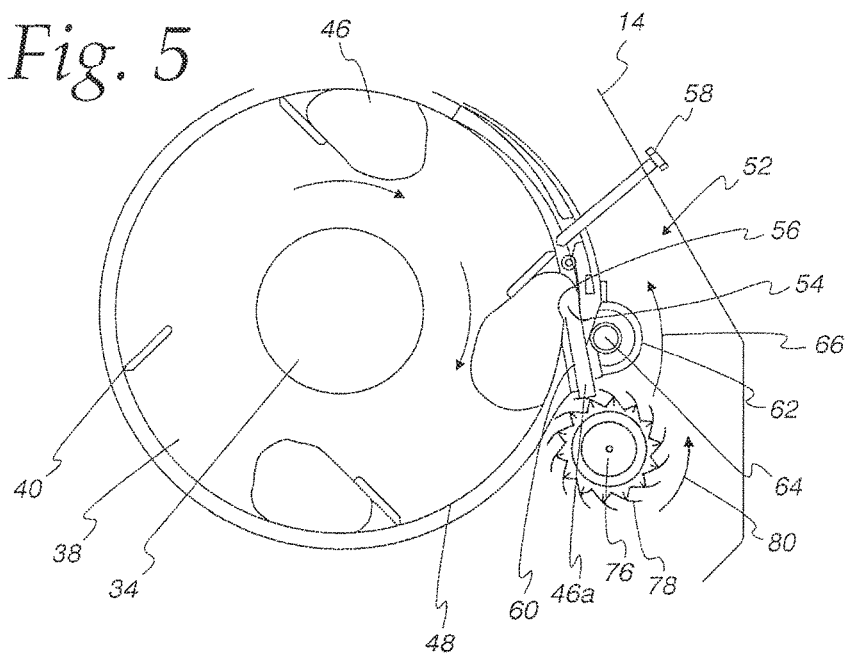
FIG. 5 is a side elevation view of the impeller and knife assembly of the apparatus of FIG. 2.

As the prepared meat product 46 is driven around the inner surface 50 of the stationary cylinder 48, it encounters the knife assembly 52, as shown in FIG. 5. The knife assembly 52 includes the opening 54 and the slicing knife 56.

The opening 54 is formed in the stationary cylinder 48 by spacing the side of the opening 54 positioned earlier in the path of rotation of the impeller 34 from the outer periphery of the impeller 34. The opening 54 can be formed anywhere on the stationary cylinder 48, and preferably is formed at a position of the stationary cylinder 48 where the rotation of the impeller 34 is in a generally downward direction and, more preferably, where the velocity of the prepared meat product 46 is generally perpendicular with the floor. The opening 54 preferably spans the width of the stationary cylinder 48 and is preferably generally horizontal. Alternatively, the opening 54 may be formed in the stationary cylinder 48 at an angle in the range of 45 degrees above or below horizontal.

In the preferred embodiment, the width of the opening 54 can be adjusted by a control knob 58. The control knob 58 is preferably adjacent to the opening 54 and attached to the side of the opening 54 spaced from the outer periphery of the impeller 34. To adjust the width of the opening 54, the control knob 58 can adjust the distance the side of the opening 54 is spaced from the outer periphery of the impeller 34. The control knob 58 can vary the width of the opening 54 in a range from 1/16 inch to 1 inch, and preferably the opening 54 is set between 1/8 inch and 3/16 inch. The width of the opening 54 set by the control knob 58 determines the maximum thickness of the meat slices 46a produced by the rotary processing machine 10.

The slicing knife 56 is positioned at the side of the opening 54 that extends along the outer periphery of the impeller 34. In the preferred embodiment, the slicing knife 56 is removably positioned at the opening 54. The removably attached slicing knife 56 may then be removed and inserted as needed, for example, to select a different type of the slicing knife 56, with a scalloped blade being preferred, to repair or maintain the slicing knife 56, or to replace the slicing knife 56. The slicing knife 56 preferably spans the length of the opening 54 and is positioned to provide the first point of contact for the meat product 46 as it is driven into the opening 54 by the impeller 34. As the paddles 40 drive the meat product 46 to the opening 54, the meat product 46 is driven beyond the outer periphery of the impeller 34 due to the spacing of the opening 54. As the paddle 40 continues to rotate, the meat product 46 is driven into the slicing knife 56 which is positioned at the outer periphery of the impeller 34, producing meat slices 46a of thickness determined by the width of the opening 54.

The slicing knife 56 may further comprise a guide surface 60. As the slicing knife 56 cuts into the prepared meat product 46, meat slices 46a are produced, and the guide surface 60 can direct the meat slices 46a away from the knife assembly 52 and towards the discharge chute 30.

Figure 6:
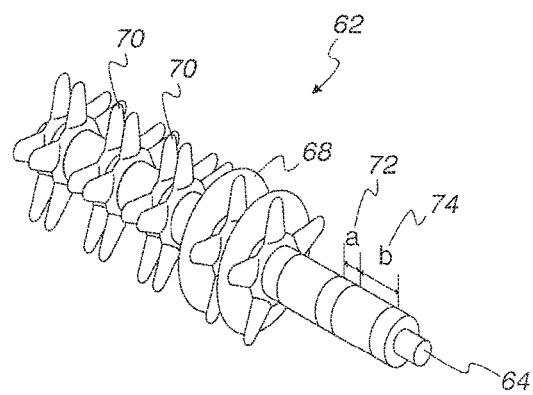
FIG. 6 is a perspective view of an optional circular knife assembly for use in the apparatus of FIG. 2.

The knife assembly 52 may further comprise the circular knife assembly 62, as shown in FIG. 6. The circular knife assembly 62 comprises at least one circular blade 68 mounted on a rotatable shaft 64 and is positioned in a direction that is generally parallel to the process feed direction. The circular knife assembly 62 is rotatably mounted to the housing 14 to preferably rotate in a direction as indicated by the arrow 66. The circular knife assembly 62 is preferably downstream and proximal to the slicing knife 56. As the meat slices 46a are produced, they may travel down the guide surface 60 of the slicing knife 56. While on the guide surface 60, the at least one circular blade 68 may then further reduce the size of the meat slices 46a.

In the preferred embodiment, the circular knife assembly 62 has dulled circular blades 68. The circular blades 68 may be artificially dulled by any method, or preferably, the circular blades 68 may be allowed to dull naturally and are not sharpened. The dulled circular blades 68 may then reduce the meat slice 46a size while still producing meat slices 46a with irregular edges consistent with the appearance of "home-style" carved meat. The dull circular blades 68 provide a natural cut by pulling the muscle fibers of the sliced meat product 46a.

The circular knife assembly 62 may alternatively contain feed discs 70 to assist in advancing the meat slices 46a. The feed discs 70 may be mounted on the rotatable shaft 64 in place of any number of the circular blades 68.

The circular knife assembly 62 may consist of between one and fifteen circular blades 68, and preferably one circular blade 68, depending on the size of the prepared meat product 46 being used and the size of the meat slices 46a desired. The chosen number of blades 68 having different spacings therebetween to cut the meat slices 46a into further reduced sizes of varying widths. As illustrated in FIG. 6, a first spacer 72 creates a gap or space of length 'a,' and a second spacer 74 creates a gap of length 'b.' The spacers 72, 74 can be alternated every other one, such that the spacing between the blades 68 is also alternating between a space of length 'a' and 'b,' or, alternatively, may be placed in any other suitable combination. The blade 68 spacing may be varied from 1/8 inch to 1 inch. For any number of the circular blades 68 not used, the feed discs 70 may be positioned on the rotatable shaft 64 instead. Preferably, the circular knife assembly 62 is composed of two circular blades 68 spaced apart by 3 inches and centered on the rotatable shaft 64 having 3/4 inch spacers 72, 74 running the length of the rotatable shaft 64. The remaining spaces between the spacers 72, 74 on the rotatable shaft 64 preferably have feed discs 70.

The knife assembly 52 may also comprise the cross cut knife assembly 76. The cross cut knife assembly 76 is positioned in a direction that is generally parallel to the process feed direction. The cross cut knife assembly 76 can be comprised of a number of cross cut blades 78 in the range of 1 to 14, and preferably 2. The cross cut blades 78 preferably run the length of the cross cut knife assembly 76 and are positioned generally parallel to the process feed direction. The cross cut knife assembly 76 is rotatably mounted to the housing 14 to preferably rotate in a direction as indicated by the arrow 80. The cross cut knife assembly 76 is preferably downstream and proximal to the slicing knife 56. As the meat slices 46a are produced, they may travel down the guide surface 60 of the slicing knife 56. As the meat slices advance beyond the end of the guide surface 60, the cross cut blades 78 may then further reduce the size of the meat slices 46a.

In the preferred embodiment, the cross cut knife assembly 76 has dulled cross cut blades 78. The cross cut blades 78 may be artificially dulled by any method, or preferably, the cross cut blades 78 may be allowed to dull naturally and are not sharpened. The dulled cross cut blades 78 may then reduce the meat slice 46a size while still producing meat slices 46a with irregular edges consistent with the appearance of "home-style" carved meat. The dull cross cut blades 78 provide a natural cut by pulling the muscle fibers of the sliced meat product 46a.

With reference to the diagram of FIG. 1, a bulk meat product is first selected for processing by the processing machine. The bulk meat product can be selected from any variety of meat product, including, for example, ham, turkey, chicken, or beef. Once the bulk meat product is selected, it can then be prepared for processing. This preparation can first include chilling the bulk meat product to the required temperature. This may include storing the bulk meat product at the desired temperature or instead chilling the bulk meat product further to reach the desired temperature. The meat product should be kept at a temperature below 40 degrees Fahrenheit for food safety purposes, and preferably, the meat product should have a temperature in the range of 30 to 35 degrees Fahrenheit when processed by the processing machine. Alternatively, the bulk meat product can be cooked or heated prior to processing. This may include cooking the meat product by any suitable means. This preparation can also include removing the bulk meat product from any casing or wrapping used to store and ship the product. This preparation may ensure that the meat product is free of any foreign material to keep any foreign material out of the final sliced product. Another option for preparation includes breaking down the bulk meat product prior to processing. The bulk meat product may be broken down by hand or other suitable means. However, it has been found that breaking down formulated turkey into smaller portions before processing can create a good, but small end product.

In any case, the prepared meat product is preferably about 10 inches in any dimension or less. Finally, the total amount of meat product may be selected. The amount of meat product selected is dependent on the amount of output slices desired and can be in a range of one meat product to more than 20 with each load into the processing machine.

A next step can include selecting a slicing knife. The slicing knife can have any type of edge, including, for example, a scalloped or a wavy edge. Once the slicing knife is selected, it may then be inserted into the processing machine. As disclosed above, inserting the slicing knife into the processing machine positions the knife at the opening formed in the stationary cylinder.

Next, a desired slice thickness can be determined. As disclosed above, the slice thickness may be in the range of 1/16 inch to 1 inch. The desired slice thickness may vary depending on the selected type of meat or the application of the desired output. Once selected, the slice thickness may then be represented on the processing machine. To alter the thickness of the slices produced by the processing machine, the width of the opening can be adjusted. The control knob is operably attached to the opening to adjust the width thereof. The slice thickness corresponds to the distance between the slicing knife and the side of the opening spaced from the outer periphery of the impeller.

The following step may include determining a desired slice width. This width may be as large as the selected bulk meat product or the broken down selected meat product, or as small as 1/8 inch as disclosed in the discussion of the circular knife assembly above. The desired slice width may vary depending on the type of the selected meat product or the application of the product intended to be produced by the processing machine. Once the desired slice width is determined, it can then be determined whether a circular knife assembly is needed. If the desired slice width is less than any dimension of the prepared meat product, the circular knife assembly may be used to further reduce the width. If the circular knife assembly is required, its setup must then be determined. This includes choosing the number of pre-dulled circular blades desired and the spacing between the pre-dulled circular blades. After the desired number of blades and spacing is determined, then the type of spacers and number of feed discs can be ascertained. Once all of the circular knife assembly materials are chosen, they may be mounted on a rotatable shaft. The assembled circular knife assembly may then be rotatably attached to the housing of the processing machine proximal to and downstream of the slicing knife.

Another step may include determining a desired slice height. This height may be as large as the height of the selected bulk meat product or the broken down selected meat product, or instead, a smaller slice may be desired. If a smaller slice height is desired, a cross cut knife assembly may be used. If the cross cut knife assembly is required, its setup must then be determined. This includes choosing the number of pre-dulled cross cut blades desired and the spacing between the pre-dulled cross cut blades, and preferably two evenly spaced dulled cross cut blades. The cross cut knife assembly may then be rotatably attached to the housing of the processing machine proximal to and downstream of the slicing knife.

Next, the processing machine may be started. A desired speed of rotation of the impeller may then be determined. The speed of the rotation of impeller influences the magnitude of the centrifugal force applied on the prepared meat product while in the impeller and, similarly, it may also influence the tumbling and orientation of the meat products while in the impeller. This process determines the edge of the meat product from which the slices are produced. If a desired speed is determined, the speed of rotation of the impeller may then be set. The available speeds may vary with the type of motor operating the processing machine, and preferably the motor can operate at 75 hertz.

The processing machine comprised of a housing, a motor, an impeller, and a knife assembly may then use the impeller having at least one paddle to rotatably drive the prepared meat product around the housing, the prepared meat product held to the housing by centrifugal force, to impact the knife assembly to create irregularly shaped meat slices.

The selected and prepared meat product can then be loaded into the processing machine. The machine operates as detailed above to output mass-scale "home-style" slices of meat of irregular shape and size. As the slices of meat are output by the processing machine, they can be collected. This may be done by placing a bag or collection bin under the discharge chute. Finally, the collected slices can be packaged.

EXAMPLES

The following examples illustrate presently preferred methods and should be understood to be illustrative of, but not limiting upon, the scope of the apparatus and method which are set forth in the appended claims.

For the following tests, the processing machine had an impeller with four equally spaced paddles, a ten horsepower motor operating at sixty hertz across the line, and a scalloped slicing knife with a 3/16 inch slice thickness. Two bags of bulk meat product, removed from the plastic casing, were used in the tests.

| Test | Meat | Temp. | Prep. | Result |
|---|---|---|---|---|
| 1 | Ham Loaves | 32° F. | Whole | Very Good Slices of Irregular Shape and Size |
| 2 | Ham Loaves | 35° F. | Broken into pieces by hand | Very Good Slices of Irregular Shape and Size |
| 3 | Ham Loaves | 35° F. | Whole | Very Good Slices of Irregular Shape and Size |
| 4 | Formulated Turkey | 30° F. | Whole | Very Good Slices of Irregular Shape and Size |
| 5 | Formulated Turkey | 30° F. | Broken into pieces by hand | Very Small Slices of Irregular Shape and Size |
| 6 | K Butt Tumbled Ham Loaves | 32° F. | Broken into pieces by hand | Very Good Slices of Irregular Shape and Size |
| 7 | K Butt Not Tumbled Ham Loaves | 32° F. | Broken into pieces by hand | Very Good Slices of Irregular Shape and Size |

For the following tests, the processing machine had an impeller with four equally spaced paddles, a ten horsepower motor operating at sixty hertz across the line, a scalloped insert knife with a 3/16 inch slice thickness, and a circular knife assembly. The circular knife assembly had one circular blade at 5 1/4 inches and feed discs positioned at the remaining spaces between the 3/4 inch spacers. Two bags of bulk meat product, removed from the plastic casing, were used in the tests.

| Test | Meat | Temp. | Prep. | Result |
|---|---|---|---|---|
| 8 | Formulated Turkey | 38° F. | Whole | Good Slices of Irregular Shape and Size |
| 9 | Ham Loaves | 34° F. | Broken into pieces by hand | Very Good Slices of Irregular Shape and Size |

For the final test, the processing machine had an impeller with four equally spaced paddles, a ten horsepower motor operating at seventy five hertz across the line, a scalloped insert knife with a ⅛ inch slice thickness, and a circular knife assembly. The circular knife assembly had one circular blade at 5¼ inches and feed discs positioned at the remaining spaces between the ¾ inch spacers. Two bags of bulk meat product, removed from the plastic casing, were used in the test.

| Test | Meat | Temp. | Prep. | Result |
|---|---|---|---|---|
| 10 | Ham Loaves | 34° F. | Whole | Very Good Slices of Irregular Shape and Size |

For the following tests, the processing machine had an impeller with four equally spaced paddles, a ten horsepower motor operating at 75 hertz across the line, a scalloped slicing knife with a 3/16 inch slice thickness, and a circular knife assembly. The circular knife assembly had two dulled circular blades one 3 inches from either end of the rotatable shaft and feed discs positioned at the remaining spaces between the ¾ inch spacers. Four pieces of bulk meat product were used in the tests.

| Test | Meat | Temp. | Prep. | Result |
|---|---|---|---|---|
| 11 | Chicken - Slit casing | 31° F. | Whole, drained juices | Very Good Slices of Irregular Shape and Size |
| 12 | Chicken | 31° F. | Whole, drained juices | Very Good Slices of Irregular Shape and Size |
| 13 | Turkey - Slit casing | 31° F. | Whole, drained juices | Very Good Slices of Irregular Shape and Size |
| 14 | Turkey | 31° F. | Whole, drained juices | Very Good Slices of Irregular Shape and Size |
| 15 | Ham - Split Top | 31° F. | Whole, drained juices | Very Good Slices of Irregular Shape and Size |
| 16 | Ham | 31° F. | Whole, drained juices | Very Good Slices of Irregular Shape and Size |
| 17 | Beef - Split Top | 31° F. | Whole, drained juices | Very Good Slices of Irregular Shape and Size |
| 18 | Turkey Breasts Halved | 31° F. | Halved, drained juices | Very Good Slices of Irregular Shape and Size |
| 19 | Chicken Breasts | 31° F. | In 12 pieces, drained juices | Very Good Slices of Irregular Shape and Size |

For the following tests, the processing machine had an impeller with four equally spaced paddles, a ten horsepower motor operating at 75 hertz across the line, a scalloped slicing knife with a ½ inch slice thickness, a circular knife assembly, and a cross cut knife assembly. The circular knife assembly had dulled circular blades at every 1½ inches and feed discs positioned at the remaining spaces between the ¾ inch spacers. Four pieces of bulk meat product were used in the tests.

| Test | Meat | Temp. | Prep. | Result |
|---|---|---|---|---|
| 20 | Beef | 97° F. | Whole, drained juices | Chunk style shreds |
| 21 | Ham | 125° F. | Whole, drained juices | Chunk style shreds |
| 22 | Ham | 120° F. | Whole, drained juices | Chunk style shreds |
| 23 | Beef | 135° F. | Whole, drained juices | Chunk style shreds |

For the following tests, the processing machine had an impeller with four equally spaced paddles, a ten horsepower motor operating at 75 hertz across the line, a scalloped slicing knife with a 3/16 inch slice thickness, a circular knife assembly, and a cross cut knife assembly. The circular knife assembly had dulled circular blades spaced 3¾ inches from each end of the rotatable shaft and feed discs positioned at the remaining spaces between the ¾ inch spacers. The cross cut knife assembly had two dulled cross cut blades positioned on opposite sides of the assembly. Two pieces of bulk meat product were used in the tests.

| Test | Meat | Temp. | Prep. | Result |
|---|---|---|---|---|
| 24 | Ham | 33° F. | Whole, drained juices | Very Good Slices of Irregular Shape and Size |
| 25 | Ham | 33° F. | Whole, drained juices | Very Good Slices of Irregular Shape and Size |
| 26 | Ham | 33° F. | Whole, drained juices | Very Good Slices of Irregular Shape and Size |
| 27 | Ham | 33° F. | Whole, drained juices | Very Good Slices of Irregular Shape and Size |
| 28 | Turkey | 33° F. | Whole, drained juices | Very Good Slices of Irregular Shape and Size |
| 29 | Turkey | 33° F. | Whole, drained juices | Very Good Slices of Irregular Shape and Size |

For the foregoing, it will be appreciated that apparatus and methods are described herein for manufacturing irregularly shaped and sized food products. While the figures and description herein are illustrative of certain aspects of methods and apparatus for manufacturing irregularly shaped and sized food products, the apparatus and methods are not limited to the aspects illustrated in the figures and described hereinabove. For example, while the description generally refers to meat as the product being produced in irregular shapes and sizes, it is understood that a process according to the present description may be used for other suitable products.

Figure 7:
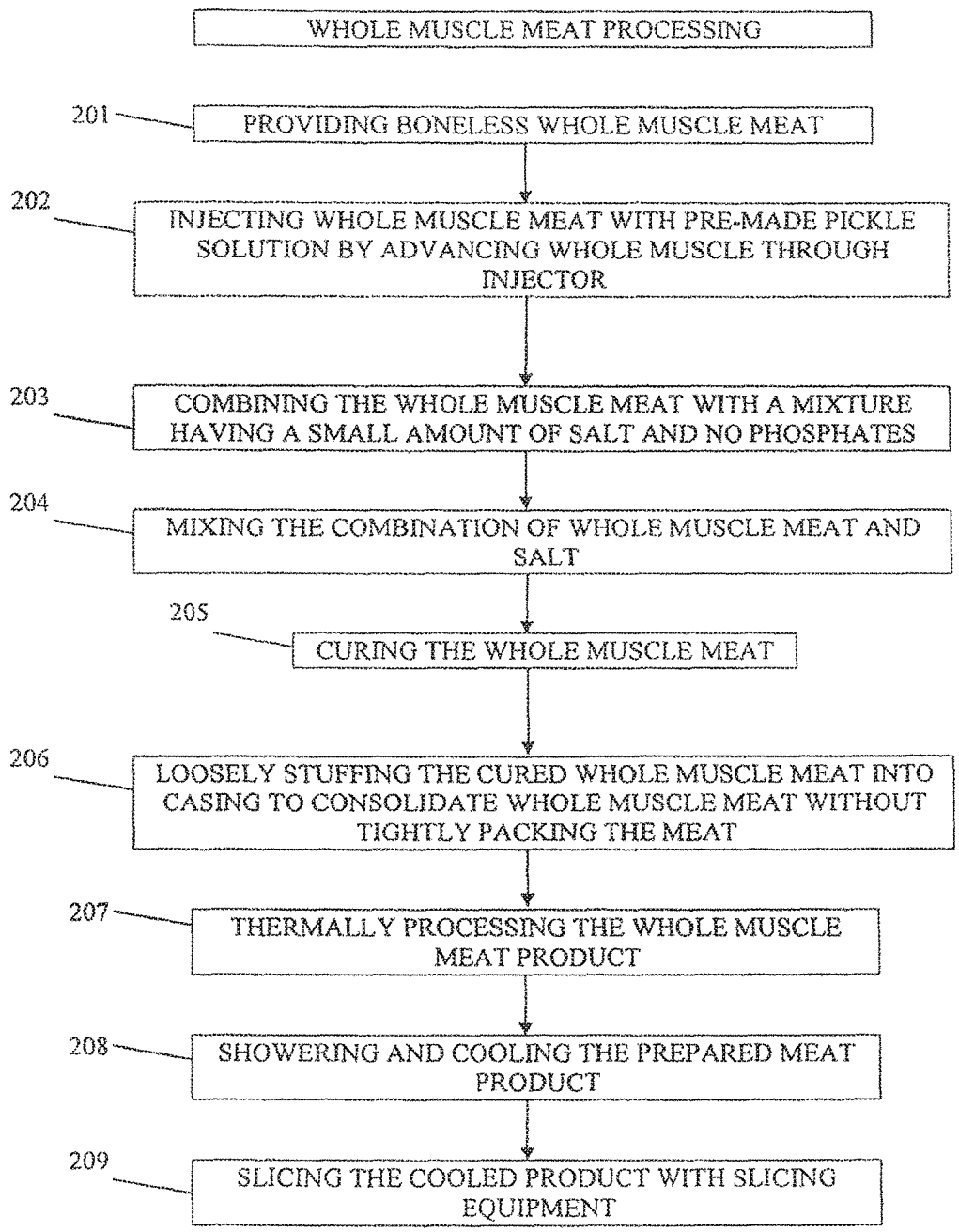
FIG. 7 is a flow diagram illustrating a process as described below.

Turning now to the preparation of the sliced meat, FIG. 7 illustrates a process 200 for producing a shaped home-style meat product having an irregular appearance. Such home-style meat products may have a variety of irregular shapes, sizes, and textures, to note but a few of the varied characteristics. By one approach, a package of such home-style meat products may have individual meat slices or pieces with irregular shapes, sizes, textured surfaces, and density. Further, it is anticipated that although each of the individual slices is varied from one slice to the next, the various parameters of each of the slices may fall within a predetermined range. For example, though the shape of the meat slices may be irregular, the shape may nonetheless, fall into a range such that a majority of the slices in a package may have a small, diced configuration or all of the slices in a package may be flat with a relatively thin depth compared to the width, to note but a few shape options.

To produce such varied slices, the rotary processing machine 10, as discussed above, may be employed to mass produce slices of meat having an irregular appearance. Process 200 also may be used to that end. Further, process 200 may be used to produce such a home-style meat product having an irregular appearance with conventional slicing equipment. Indeed, process 200 may be used, either in combination with the rotary processing machine 10 discussed above or in combination with other slicing equipment such as a reciprocating-carriage slicer, among others. Thus, if a high degree of irregularity between the meat slices is desired, the rotary processing machine 10 may be used to slice meat prepared according to process 200.

Prior to slicing the whole muscle meat, process 200 formulates a whole muscle meat mixture having a low-salt, no-phosphate solution mixed therein such that when the meat mixture is cooked and chilled, this formulation produces a whole muscle meat structure characterized by individual meat fibers that bind modest amounts of water and fat. Further, such a mixture may be loosely stuffed, as detailed below. Thus, when such formulated meat products are sliced, such as by the rotary processing machine 10 or other slicing equipment, the cut surface of the whole muscle meat is typically fractured along the lines between weakly bound fibers, thereby resulting in a sliced meat product having a rough irregular surface that displays the natural structure of the meat. Such an irregular surface is commonly found in whole muscle meats that have been prepared in the home.

Alternatively, in conventional meat processing applications, product formulations are designed to maximize protein functionality and when such a formulation is combined with conventional slicing technology, a meat product with smooth, regular surface cuts is produced. To create such a standardized product, conventional processing indicates that once the deboned whole muscle meat is supplied, it is then mixed with a pickle solution having a relatively high salt concentration and phosphates to increase functionality. Phosphates function like ATP in the muscle structure. They temporarily break the chemical bonds between protein bundles and allow the protein structure to open up and hold water. By one approach, the deboned whole muscle meat is treated in a pickle injector that injects pickle solution into the meat. The injector uses hypodermic-type needles to puncture the meat and to inject a pickle solution through needles into the meat, as the meat travels through the pickle injector on a conveyor. The injection step helps diffuse pickle solution through the meat and also serves to tenderize the meat. Various pickle solutions may be employed for meat processing. Conventional pickle solutions include a mixture of: water, salt, nitrite, phosphate, ascorbate, erythorbate, and sugar to note but a few ingredients. A typical curing solution contains 10% salt, 2.3% sodium phosphate, 62% water, 0.3% sodium ascorbate, 0.09% sodium nitrite, 3.5% sugar, 20% sodium lactate. In a typical product, such as a deli-shaved meats, around 20 lbs of pickle may added to 100 lbs of meat. This will result in having 2 lbs of salt per 100 lbs of meat.

Additional pickle solution may be added to the whole muscle meat after the injector step if desired. Once the meat has been combined with the solution, the conventional batch is mixed for a specified period of time, typically about 60 minutes. Once mixed, the meat mixture is allowed to cure for between approximately 24-48 hours.

Once the meat has cured, the conventional meat is tightly stuffed into casings. Conventional wisdom encouraged stuffing the casings tightly to avoid creating void spaces inside the casings, which resulted in excess moisture being expelled from the meat. Once stuffed, the meat is cooked just above 155° F., anywhere from between 3 and 6 hours. Then, the meat is cooled, and sliced. Such conventionally prepared meat may be sliced in a variety of slicing equipment including the rotary processing machine 10 discussed above. Slicing such conventionally prepared meat on conventional slicing equipment produced a meat product having regular, standardized appearance. Such a meat product typically has little variations between shape, surface, and texture of the slices or pieces produced. Alternatively, if the conventional meat product is sliced using the rotary processing machine 10, the resulting product exhibits a moderate degree of irregularity between the meat pieces and avoids the meat product having the standardized regular appearance typically resulting from meat processing.

In another embodiment, to mass produce a home-style product having an intentionally differentiated texture and appearance with a high degree of irregularity between the meat pieces, process 200 may be employed with the rotary processing machine 10. Further, as discussed below, process 200 may also be employed with other slicing equipment to provide a moderate degree of irregularity between the meat pieces. In determining how to prepare and slice the whole muscle meat, the desired product including the desired level of irregularity and differentiation between the various meat slices should be considered.

As illustrated in FIG. 7, process 200 includes receiving or providing 201 deboned whole muscle meat at a processing plant. Further, the whole muscle meat is combined 203 with a mixture or solution having a small amount of salt and having no phosphates. By one approach, the whole muscle meat provided 201 undergoes a pickle injection step 202. Such a pickle injection step, as discussed above, delivers the pickle solution to the whole muscle meat via hypodermic-type needles. However, unlike the conventional process, the whole muscle meat is not combined with phosphates in process 200. Thus, the pickle solution of process 200 has no phosphates and, further, has a limited amount of salt therein. By one approach, the pickle solution added to the whole muscle meat will be less than 2 lbs. of salt per 100 lbs. of meat. In one illustrative embodiment, approximately half the amount of salt used in a conventional product is added to the whole muscle meat in process 200. For example, about 10 lbs. of pickle solution having a 10% salt concentration may be added to 100 lbs of meat to end up with 1 lbs of salt in 100 lbs. of meat. Once the pickle injection step is complete, the whole muscle meat may be further combined with additional pickle solution having a small amount of salt and lacking any phosphates.

Once the whole muscle meat has been combined 203 with the low-salt, phosphate-free solution, the combination may be mixed 204 together such as in a tumbler or other mixing apparatus. The combined whole muscle meat may be mixed 204 for a specified of time period. By one approach, the mixing step is approximately 30 minutes or less. Alternatively, the mixing step may be between 30 and 60 minutes, depending on the desired end product. However, it is important that the meat not be over mixed and, thus, it is desirable to have the mixing extend no longer than 60 minutes and preferably closer to 30 minutes. Significant mixing promotes binding of the muscle structure such that the structure binds more tightly. In turn, the cut surface of the meat slices will not fracture along the irregular protein strand seams but will slice smoothly and have a more conventional sliced meat appearance. Once the whole muscle meat has undergone sufficient mixing, the meat is collected in a vat for a period of time to permit the salt and other ingredients to diffuse uniformly throughout the meat pieces. The length of the cure time may depend on the desired final product. In one illustrative embodiment, the whole muscle meat is retained in a cooler for between 24 and 48 hours.

The whole muscle meat may then be stuffed 206 into casings in which the meat is cooked. Unlike conventional processing where the meat is tightly packed into the casing, however, process 200 loosely stuffs 206 the meat product into the casings. As used herein, the term loosely stuffs indicates that the whole muscle meat is stuffed into the casings such that voids are permitted to occur between the individual whole muscle meat pieces and between the pieces and the casing. Further, such voids create irregularities in the meat product during the cooking phase via moisture expulsion. The low-salt, no-phosphate solution is a relatively poor water binder and thereby encourages water loss through evaporation and expulsion, similar to what occurs in home-style cooking. Comparatively, a conventional product having a higher salt solution and phosphates is relatively a good water binder, which results in a higher product yield. However, such a product produces a very regular appearance. By allowing the water to escape form the system, irregularities in the final product are further introduced.

Since the low-salt, no phosphate solution does not promote significant water binding, the casing is relied upon to retain some of the moisture within the meat structure. However, certain casings may retain too much water or may not permit expansion of the product, thereby unduly increasing the pressure inside the casing, while others may permit too much water loss. The meat cooked in the average home-oven produces a significant amount of steam and meat juices collect in the pan, which is the result of moisture evaporation and expulsion from the meat. Thus, the casing used in process 200 typically permits significant amounts of moisture loss.

As mentioned, the water loss occurs through the casings, which may be comprised of a variety of natural or synthetic materials. For example, a thin mesh fabric or wire mesh may be used, to note but a few. Whatever the material, it is desirable for the casing to permit some expansion of the meat product and also permit loss of water, both of which relieve some of the pressure created in the product. By one approach, the casings are pre-stuck casings that have openings, such as slits or holes, created therein prior to stuffing and cooking. These openings allow the water to escape from the casing.

In sum, some void space is deliberately left within the casing once it is filled with the meat product. This void space permits moisture expulsion and keeps the pieces from "gluing" together to thereby help create a meat product with a home-style appearance by creating surfaces with an irregular texture. To that end, the casings selected also encourage some amount of water loss. Thus, the manner of stuffing the casings and the casings themselves contribute to the irregularities in the final cooked product.

Further, once the casings have been loosely stuffed 206, the casings may be thermally processed 207 such as through cooking at a temperature of at least 155° F. In one illustrative embodiment, a series of temperature steps are employed, where the temperature gradually increases to reach the final temperature, just over 155° F. For example, by one approach, the final product temperature at the end of the cooking cycle is approximately in between the 155°-170° F. range, whereas and the air temperature in the final cook step is in the range of approximately 180°-210° F., depending on the product. Comparatively, such temperatures are a bit higher than those conventionally used and this drives off more moisture by evaporation. A loss of between 22-28% of the total ingoing product weight is targeted. For example, for 100 lbs. of product that is introduced into the smokehouse, approximately 72-78 lbs. of product will exit the smokehouse after cooking. Such loss, as described above, results from evaporation and expulsion. This is quite different from conventional products, where as much water as possible is retained.

The cook process takes about 6 hours, while conventional cook times range from 3 to 6 hours. Thus, the cook time of process 200 is at the long end of the spectrum. Further, as mentioned above, the cook temperature is at the higher end, as well. Thus, water loss is encouraged, which contributes to the final product's varied texture. Encouraging such water loss is possible because the solution does not have a high salt concentration or phosphates that bind the water.

After the meat produce has been cooked, the casings of meat products are cooled 208. By one approach, such cooling occurs by showering the casings with chilled water. By yet another approach, the casings and meat product are permitted to chill by removing the casings from the heat source and exposing the outside of the casings to chilled air. The water shower, if used, will expose the casings to water at approximately 34-38° F. for about 30 minutes. The air chill takes about 7 hours and uses 18-25° F. air to reduce the product temperature to the desired slicing temperature of 29-31° F.

Once the casings and meat product have cooled, the prepared meat may undergo slicing 209 to produce the home-style meat with individual pieces have an irregular appearance. Such slicing 209 may occur in a variety of slicing equipment. Since process 200 prepares the whole muscle meat in a manner such as to purposefully create irregularities in the final product, such a prepared meat mixture may be sliced in a conventional slicer and may still exhibit a degree of irregularity between the sliced pieces. In addition, if a high degree of irregularity is desired the whole muscle meat prepared according to process 200 may be sliced in the rotary processing machine 10. As discussed above, the rotary processing machine has an impeller 34 with equally spaced paddles 40 that rotate and carry the meat product to be sliced by slicing knife 56 having a dulled cutting edge. Such a configuration wherein the chunks of whole muscle meat are exposed to the stationary slicing knife from different angles creates further irregularities in the low-salt, phosphate-free meat product. Alternatively, a slicer with a less random and varied manner of slicing would still produce an irregularly textured meat product if process 200 were employed to prepare the meat.

For example, a slicer with a reciprocating carriage and a stationary blade typically orients the meat relative to the slicing knife based on the manner of delivery of the meat, such as through a feed tube or hopper. The orientation of the meat product in such a feed tube does not widely vary as the whole muscle meat does not have room to rotate or significantly shift around. Instead, the whole muscle meat slowly advances toward the slicing knife as leading portions of the whole muscle meat are sliced from the unsliced portion. Such a slicer typically produces a sliced meat product having standardized, highly regular characteristics, however, such equipment may be used to produce irregularly textured and shaped meat slices if the sliced meat is prepared according to process 200.

Thus, a home-style carved meat product having intentionally irregular and controlled variations, which are within certain parameters including size, shape, texture, and density, may be produced by slicing on a rotary processing machine 10 or by preparing the whole muscle meat according to process 200. Further, a home-style carved meat product having a high degree of irregularity may be produced by preparing whole muscle meat according to process 200 and then slicing the prepared meat in the rotatry processing machine 10.

While process 200 illustrated in FIG. 7 may occur in order of the steps listed, such as combining 203 the whole muscle meat with a small amount of salt and without phosphates after the boneless whole muscle meat has been provided 201 to the meat processing plant. It is also contemplated that the steps of process 200 may occur in a variety of other orders as well For example, combining 203 the whole muscle meat with the low-salt, phosphate-free solution may occur prior to providing 201 the whole muscle meat at the processing plant. Further, in such a configuration, curing 205 of the whole muscle meat may occur during several of the other steps. Thus, it is contemplated that the steps of process 200 may occur in a variety of sequences.

Sliced meat having a home-style appearance preferably will have increased irregularities in the slice surface, such as an increase in surface roughness, as compared to conventionally prepared meat. In addition, the range of irregularities is higher, such as the range of surface roughness is also larger.

To demonstrate the increased surface irregularity, test samples of ham processed according to process 200 were compared with samples of conventionally processed ham. As discussed below, five samples of conventionally produced ham and seven test samples of ham produced according to the invention described herein were examined.

To examine the differences between the two samples, digital images of the samples were taken and then the images were evaluating by examining the difference in the contrast between pixels to determine a surface irregularity value. The images were captured by scanning the samples with an EPSON Pro 750 instrument at 300 dpi and then analyzed using Image-Pro Plus Version 5.1. The texture (surface roughness) was examined by comparing the intensity of the light reflected off the surface. Elevated portions of the sample were indicated by a darker pixel and lower portions of the sample were indicated by a lighter pixel. For example, a sample, with a high degree of variation included many high spots (dark) and low spots (light) within a certain area indicated. This variations in pixels indicated that the sample had a rough surface.

To evaluate the images, a portion of the image (7 pixel by 7 pixel area) was examined for the variation in brightness, which was interpreted as texture (surface roughness). These 7×7 pixel areas were compared with other 7×7 pixel areas. By one approach, the mean brightness of the various areas was compared with mean brightness of other 7×7 pixel areas. The surface irregularities value listed below refers to local variation in brightness from one area to the next. Both the range (difference between the maximum and minimum brightness values in a neighborhood) and the variance (statistical variance of pixel values in any particular area) were examined.

| VARIANCE 7 × 7 IMAGE | SURFACE IRREGULARITIES VALUE |
|---|---|
| Conventional Ham Sample #1 | 55.65 |
| Conventional Ham Sample #2 | 44.60 |
| Conventional Ham Sample #3 | 60.81 |
| Conventional Ham Sample #4 | 53.91 |
| Conventional Ham Sample #5 | 57.67 |
| Test Ham #1 | 75.82 |
| Test Ham #2 | 76.56 |
| Test Ham #3 | 94.16 |
| Test Ham #4 | 73.55 |
| Test Ham #5 | 68.13 |
| Test Ham #6 | 76.35 |
| Test Ham #7 | 58.64 |

The five samples of conventionally produced ham had surface irregularity values falling between approximately 44.60 and 60.61. In contrast, images of the seven samples of the test ham had surface irregularity values ranging from approximately 58.64 to 94.16. The mean variance for the conventional ham was 54.53, whereas mean variance for the test ham was 74.74. Thus, the test ham showed significantly more variation in the surface (increased amount of difference between the light and dark pixels). In short, ham according to process 200 has noticeable surface irregularities that help create the home-style appearance desired by many consumers. Thus, in one embodiment, the home-style meat product has a surface irregularity value of above 61. In one example, the home-style meat product has a mean variance surface irregularity value of greater than about 70. In another embodiment, the home-style meat product has a mean variance surface irregularity value of greater than about 75. By yet another approach, the meat produced according to the invention herein has a mean variance of at least 25% more than conventionally produced meat products.

Figure 8:
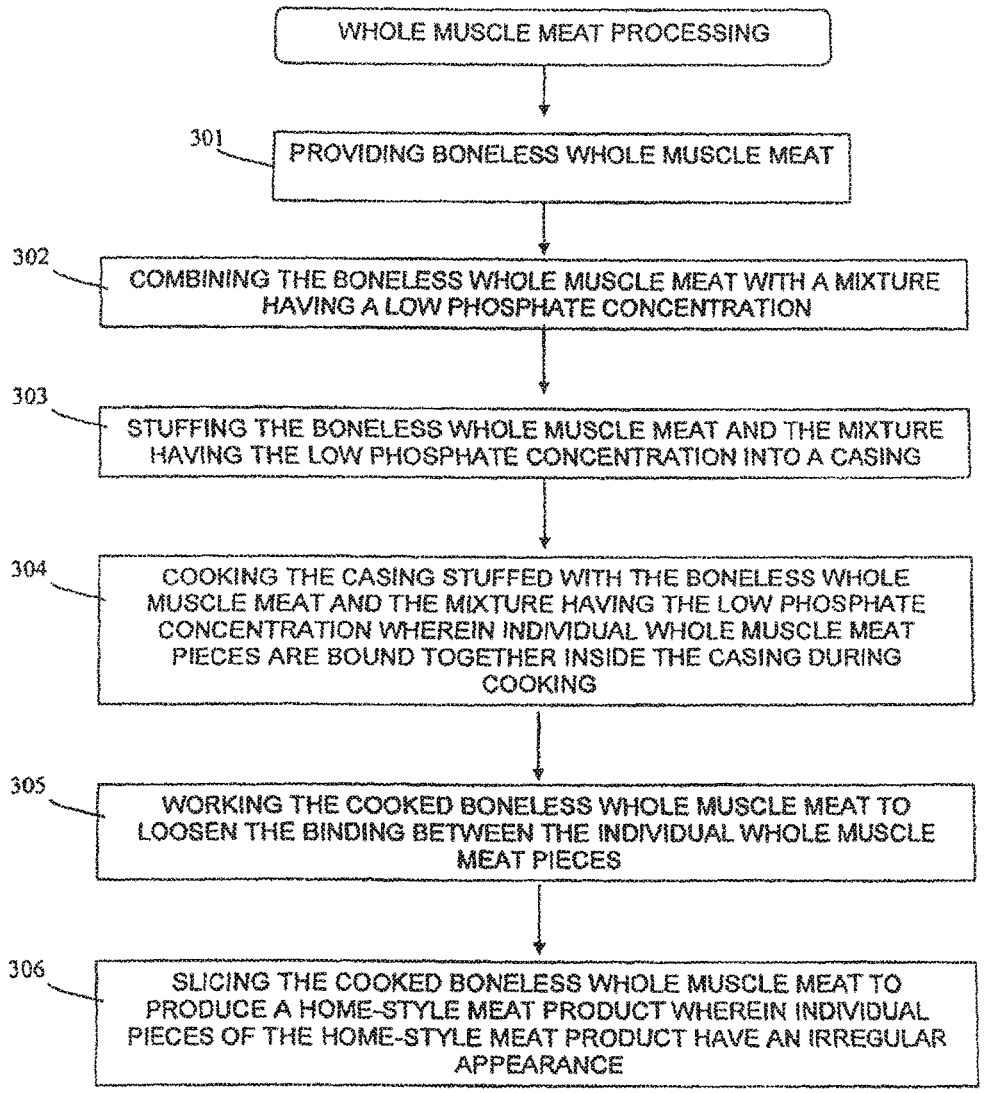
FIG. 8 is a flow diagram illustrating a process as described below.

Turning now to yet another manner of preparing the meat prior to slicing, FIG. 8 illustrates a low-phosphate process 300 that produces a home-style meat product having an irregular appearance. The process 300 may be used to mass-produce a home-style meat product at a rate of 4,000-10,000 lbs per hour. The low-phosphate process 300, like process 200, may be employed with conventional slicing equipment, such as a Grote slicer. This ability to process home-style meat products on a conventional slicer provides a significant amount of flexibility to process 300. Slicing may also be performed using the rotary processing machine 10 described above. In another approach, a continuous feed involute blade slicer with adjustable hold down rollers may be used. The hold down rollers may perform working of a meat product before slicing, as discussed in greater detail below.

Low-phosphate process 300 is configured to produce home-style meat products having individual meat slices or pieces with irregular shapes, sizes, textures, and surface densities, to note a few of the varied characteristics. Further, it is anticipated that although each of the individual slices is varied from one slice to the next, the various parameters of each of the slices in a given package may fall within a predetermined range. For example, though the shape of the meat slices may be irregular, the shape may, nonetheless, fall into a range such that a majority of the slices in a package may have a small, generally diced configuration or all of the slices may be generally flat with a relatively thin depth compared to the width, to note a few of the shape options.

As illustrated in FIG. 8, process 300 includes receiving or providing 301 boneless whole muscle meat, which may include poultry, pork, and beef, to note but a few options.

The whole muscle meat is combined 302 with a mixture, such as a pickle solution, having a low phosphate concentration. By one approach, the combination 302 includes combining and mixing the pickle solution and raw meat with a minimal amount of mechanical work being done to the raw whole muscle meat. In an illustrative approach, the whole muscle meat is not aggressively macerated, ground, aggressively mixed or tumbled for extended periods of time, or otherwise significantly worked prior to cooking 304.

A pickle injector and/or a tumbler may be used to combine 302 the mixture with the whole muscle meat. The pickle injection process, as described above, may be used to introduce the pickle solution into the inside of the individual muscle pieces. A pickle injector, such as the injector manufactured by Wolf-Tec, may be used for such purposes. Along with or instead of the pickle injection, the whole muscle meat may undergo tumbling such that the whole muscle meat is mixed and massaged with the pickle solution. The whole muscle meat may undergo tumbling for different lengths of time depending on the particular solution used, size of the whole muscle pieces, and the previous and subsequent processing of the meat. The whole muscle meat may be tumbled with the pickle solution for between 30 minutes and 2 hours. In one illustrative example, the meat is tumbled tor between 1 to 1.5 hours. Tumbler equipment that gently tumbles or massages the pre-cooked whole muscle meat under vacuum to thereby mix the meat and solution is known in the art and includes those produced by the manufacturer Challenge-RMF, Inc. Despite the approach employed for combining 302 the meat and the mixture, it is anticipated that the method will impart a limited amount of mechanical action to the whole muscle meat prior to thermal processing or cooking 304.

As mentioned, the pickle solution or mixture combined in step 302 has a low phosphate concentration. Conventional solutions may include about 3 to 3.5% phosphate by weight, and sometimes may be even higher, resulting in a meat formulation of up to 0.5% phosphate in the final meat product. In addition, a typical injection, tumbling, and mixing operation may add approximately 20% solution or more, such that at least 20 lbs. of solution is added to 100 lbs. of meat. The pickle solution or mixture used in step 302 is in the range of 1-2% sodium phosphate. Further, it is anticipated that the solution includes a moderate salt concentration such that the salt concentration is between 7-12%.

By one approach, the mixture may include 40-60% water, 1-2% phosphate, 7-12% salt, 30-40% lactate, less than 0.3% nitrite, and less than 0.3% sodium ascorbate. The amount of pickle solution added to the meat is typically dependent on the particular final product desired and the particular pickle solution being added to the meat. Nonetheless, by one approach, approximately 10-20 lbs. of the mixture may be added to 100 lbs. of whole muscle meat. In yet another illustrative example, the mixture may include 48-52% water, 1-2% phosphate, 8-11% salt, 35-39% lactate, less than 0.3% nitrite, and less than 0.3% sodium ascorbate. In one example, approximately 14-18 lbs. of the mixture may be added to 100 lbs. of whole muscle meat. A low phosphate mixture produces a lower bind between the individual muscle pieces during the thermal processing or cooking stage, which will be more easily separable prior to slicing, as discussed below.

Once the whole muscle meat has been combined 302 with the low-phosphate mixture, the combination may be stuffed 303 into a casing. A variety of equipment may be used during the stuffing operation. To advance the meat and mixture into the casing, a piston-pump may be employed to push the meat into a clipper/sizer that has casings and a stuffing horn attached thereto. To retain the whole muscle character of the whole muscle meat, a stuffing horn of sufficient size is employed. For example, it is anticipated that a stuffing horn of between 3 and 4 inches will be employed. In addition, an automatic double clipper such as the Poly-Clip System clippers may be used as well.

A number of different casings may be used including fibrous casings such as those considered pre-stuck casings. In one illustrative example, a Viskase double pre-stuck casing may be employed to contain the whole muscle meat. Since the casings used in such processing are typically not edible, such casing should be removed before slicing.

Once the casings have been stuffed, they can be thermally processed or cooked 304 to produce cooked whole muscle meat logs. Due to the low-phosphate levels of the mixture and the limited amount of mechanical working done to the meat prior to cooking, the binding between the individual muscle pieces is relatively loose. The cooking typically occurs such that the meat reaches a temperature of between 155° to 170° F., whereas the air temperature in the final cook step is in the range of approximately 180° to 210° F., depending on the final product. The cook process may take between approximately 3 to 6 hours. In one illustrative embodiment, the cook process takes approximately 4 to 5.5 hours. After the cooking step, the cooked whole muscle meat logs are permitted to chill prior to slicing. A variety of processes may be employed for cooling the cooked meat logs. For example, a cold water shower, a brine chill, or a cold air chill may be used, among others.

Once the meat has sufficiently cooled, the cooked meat may undergo working 305 to loosen the binding between individual whole muscle meat pieces. During the cooking operation, individual muscle pieces bind to water, flavorings, and one anther. Though, due to the low phosphate content along with a limited amount of mechanical action applied to the meat prior to cooking, the binding between the whole muscle pieces in the product produced according to process 300 is much looser than is otherwise present in a conventional product. By working the meat to loosen the binding, the individual muscle pieces separate from one another such that when they undergo the slicing operation, the slices appear irregular. More particularly, when a solid, tightly bound meat log is sliced, the resulting slices exhibit a high degree of regularity. Alternatively, when the meat log has variations in shape, variations in appearance around the outer edge of the product, density variations and possible void spaces between the whole muscles, the resulting slices exhibit a relatively high degree of irregularity. Working 305 creates such variations in the meat log or meat slices.

Working 305 of the cooked whole muscle meat logs can occur in a variety of manners. By one approach, the working 305 of the cooked whole muscle meat logs may occur prior to slicing 306. By yet another approach, the working 305 of the cooked whole muscle meat logs may occur subsequent to slicing 306. The particular approach employed may depend on the desired final product, among other factors. It is anticipated that the casings can be removed either before or after working 305 of the whole muscle meat log if the working 305 precedes slicing 306. If the working 305 occurs after slicing 306, the casing would be removed prior to slicing 306 and thus, the working 305 occurs with the casings removed.

Working 305 that occurs prior to the slicing 306, though after cooking 304, may include pressing, puncturing, massaging, kneading, pounding, tearing, and pulling, among other options. These operations may occur such that the meat log is stationary or is advanced in a downstream direction, such as by feeding the meat onto a moving belt. If the whole muscle meat log remains stationary, a stationary press, flat plate, or other equipment may be employed. Alternatively, if the whole muscle meat is advanced in a downstream direction during working 305, the meat logs may pass through rollers or other equipment configured to exhibit pressure on the meat logs as it advances downstream. In one illustrative embodiment, the whole muscle meat logs may be advanced between a pair of belts.

If the working 305 is generated by gently tearing and/or pulling, the tearing and pulling primarily separate individual whole muscle pieces apart from one another and do not significantly separate the muscle fibers of the individual whole muscles.

Working 305 that occurs after the slicing operation 306 and after cooking 304 may include tumbling and augering of the sliced whole muscle meat. By tumbling the cooked 304 and sliced 306 whole muscle meat, the slices are moved, massaged, and tumbled around to give the meat slices an irregular appearance. Unlike the tumbling that may be done prior to cooking, which helps mix the pickle solution with the raw whole muscle meat, the post-slicing tumbling is typically not done under vacuum. Further, such post-slice tumbling is considerably shorter than the pre-cook tumbling. By employing auger equipment to gently work the cooked 304 and sliced 306 whole muscle meat, the slices are advanced through a screw or conveyor auger that is sufficiently sized to provide gently mixing and rotating of the meat pieces for a brief period of time.

It should be noted that the working 305 of the whole muscle meat logs does not destroy the overall structure of the meat log or slice. Destroying the overall structure would not produce the home-style meat desired and creates problems with slicing and packaging.

The sliced home-style meat product produced using process 300 has a range of meat piece sizes similar to sliced meat products produced in the home. In one approach for a sliced meat product, the sliced meat product includes small, medium, and large piece sizes. The small-sized pieces are sized to fall through a vibratory screen having ½ inch openings, the medium-sized pieces are sized to fall through a vibratory screen having 1 inch openings but be retained by a screen having ½ openings, and the large-sized pieces are sized to be retained by a vibratory screen having 1 inch openings. The sizes of the sliced meat pieces may vary between different types of meat and different formulations.

In one form, a sliced home-style turkey product was produced using the process 300 and the rotary processing machine 10 described above. The home-style turkey product had piece sizes with the following ranges by approximate percentage of the total weight of the product:

| Piece Size | Percent of Product |
| --- | --- |
| Large | 73-81 |
| Medium | 15-23 |
| Small | 4-5 |

In another form, a sliced home-style ham product was produced using the process 300 and the rotary processing machine 10 described above. The home-style ham product had piece sizes with the following ranges by approximate percentage of the total weight of the product:

| Piece Size | Percent of Product |
| --- | --- |
| Large | 81-88 |
| Medium | 9-15 |
| Small | 2-4 |

In another form, a sliced home-style chicken product was produced using the process 300 and either a Grote slicer or the rotary processing machine 10. The home-style chicken product had piece sizes with the following ranges by approximate percentage of the total weight of the product:

| Piece Size | Percent of Product (Grote Slicer) | Percent of Product (Rotary Processing Machine) |
| --- | --- | --- |
| Large | 73-81 | 43-51 |
| Medium | 14-22 | 34-42 |
| Small | 1-9 | 11-19 |

In one form, a sliced home-style beef product was produced using the process 300 and either a Grote slicer or the rotary processing machine 10. The home-style beef product had piece sizes with the following ranges by approximate percentage of the total weight of the product:

| Piece Size | Percent of Product (Grote Slicer) | Percent of Product (Rotary Processing Machine) |
| --- | --- | --- |
| Large | 85-93 | 67-75 |
| Medium | 6-14 | 19-27 |
| Small | 2-10 | 2-10 |

Turning to another aspect, a process is provided for producing a pulled, shredded, or sliced meat product having an appearance that closely resembles pulled, shredded, or sliced meat produced using manual culinary techniques. The process includes mixing a whole muscle meat with a solution having a low salt content in a manner to provide minimal protein extraction and maintain the natural appearance and irregularity of the whole muscle meat. The mixed whole muscle meat is cured and loosely stuffed into a casing so as to preserve an irregular composition of the whole muscle meat within the casing. The whole muscle meat is then cooked to a predetermined temperature and optionally smoked to deliver a high quality flavor and to break down the collagen and connective tissue holding the muscle fibers together. The cooked whole muscle meat is then cooled and pulled, shredded, or sliced at reduced temperatures. In this manner, the process provides a loosely bound cooked whole muscle meat that can be stored at refrigerated temperatures until subsequent pulling, shredding, or slicing as desired for a particular meat product.

Figure 9:
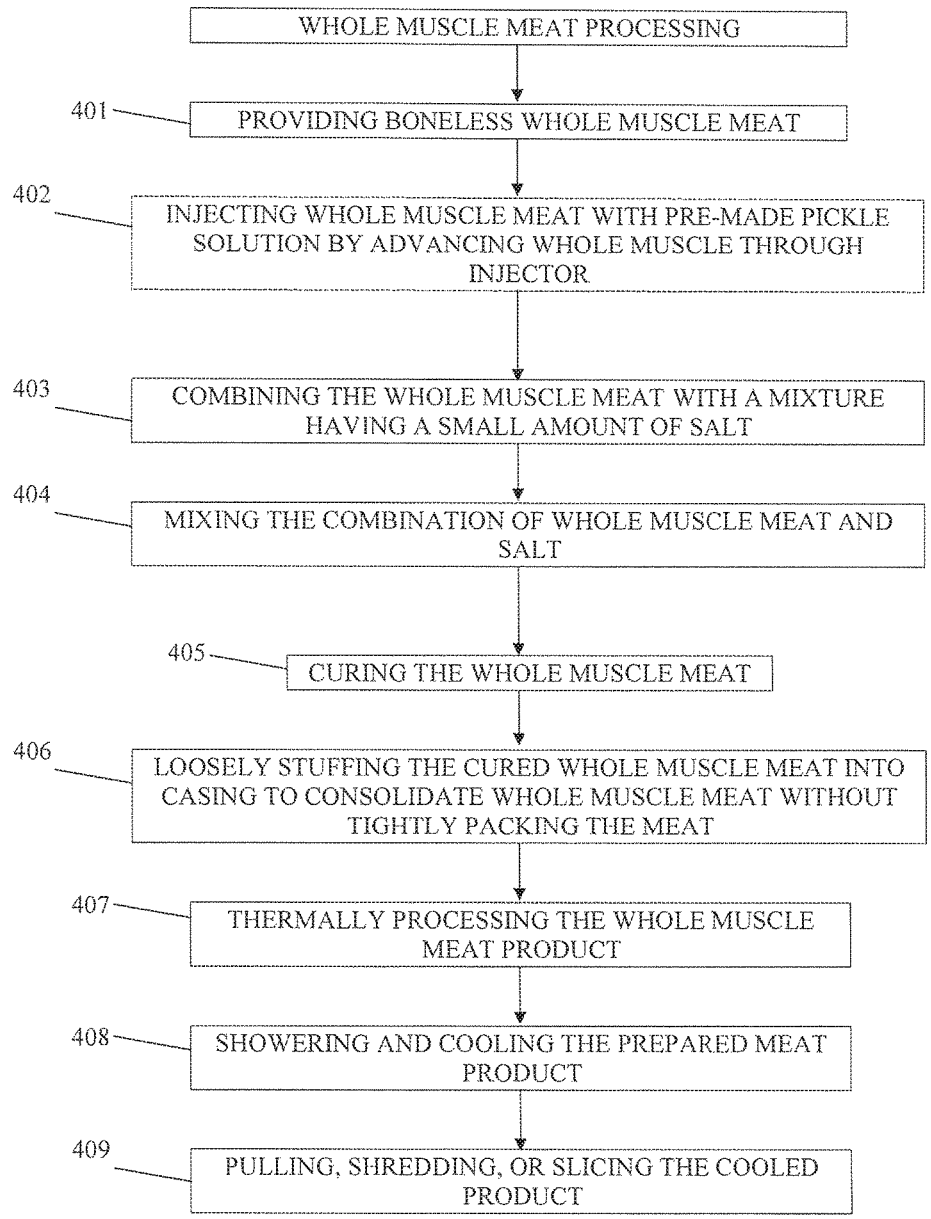
FIG. 9 is a flow diagram illustrating a process as described below.

Turning now to the preparation of a pulled, shredded, or sliced meat product, FIG. 9 illustrates a process 400 for producing a home-style meat product having a shredded, pulled, or sliced irregular appearance. The process 400 may be used to mass produce a home-style meat product at a rate of 5,000-10,000 lbs per hour. Such home-style meat products may have a variety of irregular shapes, sizes, and textures, to note but a few of the varied characteristics. By one approach, a package of such home-style meat products may have individual meat pieces with irregular shapes, sizes, textured surfaces, and density. Further, it is anticipated that although each of the individual pieces is varied from one piece to the next, the various parameters of each of the pieces may fall within a predetermined range. For example, though the shapes of the meat pieces may be irregular, the shapes may nonetheless fall into a range such that a majority of the pieces in a package may have a small thin, shredded configuration, to name one shape option.

To produce such varied pieces, a pulling machine, such as the pulling machine disclosed in U.S. Pat. No. 5,775,986 to Law et al. which issued on Jul. 7, 1998, may be used in conjunction with process 400 to mass produce pieces of meat having an irregular appearance. Alternatively, other pulling, shredding, or slicing equipment may be used in conjunction with process 400 to produce such a home-style meat product having an irregular appearance.

Prior to pulling, shredding, or slicing the whole muscle meat, process 400 includes providing a whole muscle meat mixture having a low-salt solution mixed therein. When the meat mixture is cooked and chilled, the formulation produces a whole muscle meat structure characterized by individual meat fibers that bind modest amounts of water and fat. Further, such a mixture may be loosely stuffed, as detailed below. Thus, when such formulated meat products are pulled, shredded, or sliced, such as by a pulling machine or other equipment, the cut surface of the whole muscle meat is typically fractured along the lines between weakly bound fibers, thereby resulting in a pulled meat product having a rough irregular surface that displays the natural structure of the meat. Such an irregular surface is commonly found in whole muscle meats that have been prepared in the home.

As illustrated in FIG. 9, the process 400 includes receiving or providing 401 deboned whole muscle meat at a processing plant. The whole muscle meat is combined 403 with a mixture or solution having a small amount of salt. By one approach, the whole muscle meat provided at step 401 undergoes pickle injection 402. A conventional pickle injection procedure, as discussed above with respect to process 200, delivers a pickle solution to the whole muscle meat via hypodermic-type needles. However, unlike conventional pulled or shredded meat, the whole muscle meat utilized in process 400 has a limited amount of salt therein. To limit the amount of salt in the whole muscle meat of process 400, the pickle solution added to the whole muscle meat will be less than 2 lbs. of salt per 100 lbs. of meat. In one illustrative embodiment, approximately half the amount of salt used in a conventional product is added to the whole muscle meat in process 400. For example, about 10 lbs. of pickle solution having a 10% salt concentration may be added to 100 lbs of meat to end up with 1 lbs of salt in 100 lbs. of meat. Once the pickle injection step is complete, the whole muscle meat may be further combined with additional pickle solution having a small amount of salt.

Once the whole muscle meat has been combined 403 with the low-salt solution, the combination may be mixed 404 together such as in a tumbler or other mixing apparatus. The combined whole muscle meat may be mixed 404 for a desired time period. Mixing 404 delivers sufficient mixing for ingredient dispersion and retention while retaining the natural muscle fibers, rather than achieving significant protein extraction as in some conventional approaches. The mixing step is approximately 30 minutes or less in one approach. Alternatively, the mixing step may be between 30 and 60 minutes, depending on the desired end product. However, it is important that the meat not be over mixed and, thus, it is desirable to have the mixing extend no longer than 60 minutes and preferably closer to 30 minutes. Significant mixing promotes binding of the muscle structure such that the structure binds more tightly. In turn, the cut surface of the meat pieces will not fracture along the irregular protein strand seams but will separate smoothly and have a more conventional pulled meat appearance. Once the whole muscle meat has undergone sufficient mixing, the meat is collected in a vat for a period of time to cure 405 which permits the salt and other ingredients to diffuse uniformly throughout the meat pieces. The length of the cure time may depend on the desired final product. In one illustrative embodiment, the whole muscle meat is retained in a cooler for between 24 and 48 hours.

The whole muscle meat may then be stuffed 406 into casings in which the meat is cooked. Unlike some conventional approaches where the meat is tightly packed into the casing, process 400 loosely stuffs 406 the meat product into the casings. As used herein, the term loosely stuffs indicates that the whole muscle meat is stuffed into the casings such that voids are permitted to occur between the individual whole muscle meat pieces and between the pieces and the casing. Further, such voids create irregularities in the meat product during the cooking phase via moisture expulsion. The low-salt solution is a relatively poor water binder and thereby encourages water loss through evaporation and expulsion, similar to what occurs in home-style cooking. Comparatively, a conventional product having a higher salt solution is a relatively better water binder, which results in a higher product yield. However, such a product produces a very regular appearance. By allowing the water to escape from the system, irregularities in the final product are further introduced.

Since the low-salt solution provides a lower amount of water binding, the casing is relied upon to retain some of the moisture within the meat structure. However, certain casings may retain too much water or may not permit expansion of the product, thereby unduly increasing the pressure inside the casing, while others may permit too much water loss. The meat cooked in the average home-oven produces a significant amount of steam and meat juices collect in the pan, which is the result of moisture evaporation and expulsion from the meat. Thus, the casing used in process 400 typically permits significant amounts of moisture loss.

As mentioned, the water loss occurs through the casings, which may be comprised of a variety of natural or synthetic materials. For example, a thin mesh fabric or wire mesh may be used, to note but a few. Whatever the material, it is desirable for the casing to permit some expansion of the meat product and also permit loss of water, both of which relieve some of the pressure created in the product. By one approach, the casings are pre-stuck casings that have openings, such as slits or holes, created therein prior to stuffing and cooking. These openings allow the water to escape from the casing.

In sum, some void space is deliberately left within the casing once it is filled with the meat product. This void space permits moisture expulsion and keeps the pieces from "gluing" together to thereby help create a meat product with a home-style appearance by creating surfaces with an irregular texture. To that end, the casings selected also encourage some amount of water loss. Thus, the manner of stuffing the casings and the casings themselves contribute to the irregularities in the final cooked product.

Further, once the casings have been loosely stuffed 406, the casings may be thermally processed 407 such as through cooking at a temperature of at least 155° F. In one approach, a series of temperature steps are employed, where the temperature gradually increases to reach the final temperature, just over 200° F. For example, the final product temperature at the end of the cooking cycle is approximately in between the 170°-200° F. range, whereas the air temperature in the final cook step is in the range of approximately 180°-210° F., depending on the product. In one approach, the final product temperature is in the 160°-215° F. range. As an example, the thermal processing 407 of pork may utilize the following temperature steps:

| Step # | Step Time (min) | Dry Bulb | Wet Bulb | Smoke |
|---|---|---|---|---|
| 1 | 30 | 145 | 115 | off |
| 2 | 30 | 150 | 125 | SMOKE |
| 3 | 60 | 170 | 145 | SMOKE |
| 4 | 60 | 190 | 165 | SMOKE |
| 5 | 30 | 200 | 175 | SMOKE |
| 6 | 60 | 210 | 205 | off |
| 7 | To 200° F. internal Temp | 225 | 210 | off |

As another example, thermal processing 407 of chicken may utilize the following temperature steps:

| Step # | Step Time (min) | Dry Bulb | Wet Bulb | Smoke |
|---|---|---|---|---|
| 1 | 30 | 130 | 115 | off |
| 2 | 30 | 170 | 125 | SMOKE |
| 3 | 30 | 180 | 145 | off |
| 4 | 30 | 190 | 160 | off |
| 5 | To 170° F. internal Temp | 210 | 180 | off |

Comparatively, such temperatures are a bit higher than those conventionally used and this drives off more moisture by evaporation. A loss of between 10-28% of the total ingoing product weight is targeted depending on the product. For example, for 100 lbs. of product that is introduced into the smokehouse, approximately 75-88 lbs. of product will exit the smokehouse after cooking. Such loss, as described above, results from evaporation and expulsion. This is quite different from conventional products, where as much water as possible is retained.

The cook process may take about 6 hours, while conventional cook times range from 3 to 6 hours. Thus, the cook time of process 400 is at the long end of the spectrum. Further, as mentioned above, the cook temperature is at the higher end, as well. Thus, water loss is encouraged, which contributes to the final product's varied texture. Encouraging such water loss is possible because the solution does not have a high salt concentration that binds the water. Also, the high cook temperatures and longer cook time breaks down the collagen and connective tissues holding the meat together, allowing meat fiber bundles to separate from one another during pulling.

After the meat product has been cooked, the meat product is cooled 408. By one approach, such cooling occurs by showering the casings with chilled water. By yet another approach, the meat product is permitted to chill by removing the casings from the heat source and exposing the outside of the casings to chilled air. The water shower, if used, will expose the casings to water at approximately 34-38° F. for about 30 minutes. The air chill takes about 7 hours and uses 18-25° F. air to reduce the product temperature to the desired pulling and/or slicing temperature of 28-38° F. In one approach, the product temperature is reduced to a desired pulling and/or slicing temperature of 29-31° F.

Once the meat product has cooled, the prepared meat may undergo pulling, shredding, or slicing 409 to produce the home-style meat with individual pieces have an irregular appearance. The pulling, shredding, or slicing 409 may occur in a variety of pulling, shredding, or slicing equipment. Since process 400 prepares the whole muscle meat in a manner such as to purposefully create irregularities in the final product, such a prepared meat mixture may be pulled, shredded, or sliced in conventional equipment and may still exhibit a degree of irregularity between the pieces.

Pulling, shredding, or slicing 409 the meat products after cooling stands in contrast to a conventional process for producing pulled meat products, where the meat is pulled shortly after being cooked. Cooling the meat products after cooking provides flexibility in manufacturing because the cooled meat products may be stored and/or transported before pulling, shredding, or slicing. This flexibility is a significant benefit for larger batch sizes of cooked meat products, such as 5,000-10,000 lbs, where smaller portions of a batch may be pulled, shredded, or sliced, and the remainder cooled. The conventional process, by contrast, requires the machinery for pulling or shredding to be in close proximity to the oven in order to pull or shred the cooked meat product before spoilage of the meat product due to elevated temperatures. Further, mixing 404 the whole muscle meat and low salt solution to achieve minimal protein extraction and loosely stuffing 406 the whole muscle meat into casings loosely binds the whole muscle meat. The loosely bound whole muscle meat of process 400 may then be readily pulled, shredded, or sliced 409 despite being cooled 408.

Thus, a home-style pulled meat product having intentionally irregular and controlled variations, which are within certain parameters including size, shape, texture, and density, may be produced by preparing the whole muscle meat according to process 400. Further, a home-style pulled or shredded meat product having a high degree of irregularity may be produced by preparing whole muscle meat according to the process 400 and then pulling or shredding the prepared meat in the pulling or shredding machine. While process 400 may be used to produce a pulled or shredded product, similar steps may be taken to produce a home-style sliced meat product. For example, as shown in FIG. 9, the pulling or shredding 409 may be replaced with a slicing operation that results in irregularly shaped meat slices. To that end, a variety of meat slicers may be employed including those previously described.

While process 400 illustrated in FIG. 9 may occur in order of the steps listed, such as combining 403 the whole muscle meat with a small amount of salt after the boneless whole muscle meat has been provided 401 to the meat processing plant. It is also contemplated that the steps of process 400 may occur in a variety of other orders as well. For example, combining 403 the whole muscle meat with the low-salt solution may occur prior to providing 401 the whole muscle meat at the processing plant. Further, in such a configuration, curing 405 of the whole muscle meat may occur during several of the other steps. Thus, it is contemplated that the steps of process 400 may occur in a variety of sequences.

The process 400 may be used with different formulas to produce a desired pulled, shredded, or sliced meat product. One embodiment of a rotisserie seasoned pulled chicken product has the following composition by approximate percentage of raw formulation:

| Ingredient | Percent |
|---|---|
| Boneless/Skinless Chicken Breast | 42.97 |
| Boneless/Skinless Chicken Thigh | 42.97 |
| Salt | 0.90 |

| Ingredient | Percent |
|---|---|
| Verdad NV 30 | 2.22 |
| Verdad NV 20 | 2.97 |
| Water | 6.51 |
| Sugar | 0.96 |
| Sodium Phosphate | 0.20 |
| Rotisserie Seasoning | 0.30 |
| Total | 100 |

Another embodiment of a rotisserie seasoned pulled chicken product produced using the method 400 has the following composition by approximate percentage of raw formulation:

| Ingredient | Percent |
|---|---|
| Boneless/Skinless Chicken Breast | 42.66 |
| Boneless/Skinless Chicken Thigh | 42.66 |
| Salt | 0.89 |
| Verdad NV 30 | 1.39 |
| Verdad NV 20 | 3.76 |
| Water | 6.26 |
| Sugar | 0.96 |
| Sodium Tripolyphosphate | 0.40 |
| Rotisserie Seasoning Blend | 0.30 |
| Sodium Masker | 0.74 |
| Total | 100 |

In one approach, the rotisserie seasoning blend and the sodium masker are topically added to the whole muscle meat after the meat has been combined 403 with the low-salt solution and before the whole muscle meat and the low-salt solution are mixed 404 together using a tumbler or other mixing apparatus.

The process 400 may be used to produce a BBQ seasoned pork product. One exemplary embodiment of a BBQ seasoned pork product has the following composition by approximate percentage of raw formulation:

| Ingredient | Percent |
|---|---|
| Pork Cushions | 81.05 |
| Salt | 1.14 |
| Verdad NV 30 | 1.06 |
| Verdad NV 20 | 3.89 |
| Water | 7.07 |
| Sodium Phosphate | 0.38 |
| Brown Sugar | 0.64 |
| BBQ Seasoning Blend | 4.76 |
| Total | 100 |

Another embodiment of a BBQ seasoned pork product produced using the process 400 has the following composition by approximate percentage of raw formulation:

| Ingredient | Percent |
|---|---|
| Pork Cushions | 80.86 |
| Salt | 1.14 |
| Verdad NV 30 | 1.06 |
| Verdad NV 20 | 4.18 |
| Water | 6.98 |
| Sodium Tripolyphosphate | 0.38 |
| Brown Sugar | 0.64 |
| BBQ Seasoning Blend | 4.76 |
| Total | 100 |

In one approach, the BBQ seasoning blend is topically added to the whole muscle meat after the meat has been combined 403 with the low-salt solution and before the whole muscle meat and the low-salt solution are mixed 404 together using a tumbler or other mixing apparatus.

The process 400 may also be used to produce a hickory smoked pulled pork product. One embodiment of a hickory smoked pulled pork product has the following composition by approximate percentage of raw formulation:

| Ingredient | Percent |
|---|---|
| Pork Cushions | 84.26 |
| Salt | 1.19 |
| Verdad NV 30 | 1.10 |
| Verdad NV 20 | 4.05 |
| Water | 7.35 |
| Sodium Phosphate | 0.40 |
| Brown Sugar | 0.66 |
| Hickory Seasoning Blend | 0.99 |
| Total | 100 |

Another embodiment of a hickory smoked pulled pork product produced using the process 400 has the following composition by approximate percentage of raw formulation:

| Ingredient | Percent |
|---|---|
| Pork Cushions | 84.91 |
| Salt | 1.2 |
| Verdad NV 30 | 1.11 |
| Verdad NV 20 | 4.39 |
| Water | 7.32 |
| Sodium Tripolyphosphate | 0.40 |
| Brown Sugar | 0.67 |
| Total | 100 |

Rather than utilize a hickory seasoning blend as in the first embodiment of the hickory smoked pulled pork product, producing the second embodiment involves applying a smoke during cooking of the hickory smoked pulled pork product. In one approach, smoke is applied during cooking by burning or smoldering wood chips and drawing the smoke from the burning or smoldering wood chips into the smokehouse.

In general, meat products produced using the process 400 can have the following composition ranges by approximate percentage of raw formulation:

| Ingredient | Hickory Pork | BBQ Pork | Rotisserie Chicken | Meat |
|---|---|---|---|---|
| Meat | 75-90% | 75-90% | 75-90% | 75-90% |
| Salt | 0.8-1.5 | 0.8-1.5 | 0.8-1.5 | 0.8-1.5 |
| Water | 5.0-15.0 | 5.0-15.0 | 5.0-15.0 | 5.0-15.0 |
| Verdad NV 30 | 0.5-3.0 | 0.5-3.0 | 1.0-2.5 | 0.5-3.0 |
| Verdad NV 20 | 3.0-6.0 | 3.0-6.0 | 2.0-5.0 | 2.0-6.0 |
| Phosphate | 1.5-4.5 | 1.5-4.5 | 1.5-4.5 | 1.5-4.5 |

-continued

| Ingredient | Hickory Pork | BBQ Pork | Rotisserie Chicken | Meat |
|---|---|---|---|---|
| Sugars | 0.75-4.0 | 0.75-4.0 | 1.0-4.0 | 0.75-4.0 |
| Seasoning/Spices | 0.0-2.0 | 2.5-7.5 | 0.2-2.0 | 0.0-7.5 |

The composition ranges are listed in the above table by meat type. The table also discloses general composition ranges in the rightmost column of the table for meat products in general.

As will be appreciated, there are many different types of salts and phosphates that are commonly used within the meat industry and may be used as ingredients of meat products produced from processes described herein. For example, phosphates that may be used include monophosphates, polyphosphates, and tripoly phosphates, and their derivative sources such as sodium phosphates, potassium, and calcium phosphates. Salts that may be used include sea salts, flake salts, potassium chloride, and curing salts, among others.

In another approach, pre-converted celery juice may be used to replace sodium nitrite in the meat products disclosed herein. Approximately 0.5% pre-converted celery juice may be used as calculated on a 100% raw formula basis. Concentrated celery juice (and most all other vegetables) contain naturally occurring nitrates. These nitrates are absorbed by the vegetable as the vegetable grows and matures. The nitrates are converted to nitrites during a pre-conversion process, facilitating a natural curing agent. In conjunction with the celery juice, a 0.1% cherry powder may be added as a "cure accelerator". The function of cherry powder is similar to that of sodium ascorbate/erythorbate and is used for color development and color preservation.

The pulled, shredded, or sliced meat product produced using process 400 has individual muscle strands and a range of meat piece sizes similar to pulled, shredded, or sliced meat products produced in the home. In one approach for a pulled meat product, the pulled meat product includes small, medium, and large piece sizes. The small-sized pieces are sized to fit through a screen having ¼ inch openings, the medium-sized pieces are sized to fit through a screen having ½ inch openings but be retained by a screen having ¼ inch openings, and the large-sized pieces are sized to be retained by a screen having ½ inch openings. As an example, a pulled pork product may have the following sizes by approximate percentage of the total weight of the final pulled pork product: 36% large, 50% medium, and 14% small.

The sizes of the pulled meat pieces may vary between different types of meat and different formulations. In one form, acceptable pulled or shredded meat piece sizes for pork and chicken have the following ranges by approximate percentage of the total weight of the final pulled or shredded product:

| Piece Size | Percent of Product |
|---|---|
| Large | 24-36 |
| Medium | 50-69 |
| Small | 7-14 |

One type of pulling equipment that may be used in conjunction with the process 400 is a 2-D belt slicer modified to produce a pulled meat product. More specifically, the 2-D belt slicer may have a belt that transports cooked and cooled meat from step 408 of process 400. The 2-D belt slicer may also have a first spindle that performs a compression and advancement of the cooked and cooled meat. The 2-D belt slicer may have a second spindle that advances the meat and may cut the meat. Finally, the meat may be advanced toward a third spindle of the machine that has elements configured to pull and tear the meat. The pulled meat may be collected and packaged after being advanced beyond the third spindle.

In one form, the process 400 was performed using the modified 2-D belt slicer described above to produce a pulled pork product. The pulled pork product had the following ranges of meat piece sizes by approximate percentage of the total weight of the product:

| Piece Size | Percent of Product |
|---|---|
| Large | 58-68 |
| Medium | 21-31 |
| Small | 5-15 |

The small-sized pieces fit through a vibratory screen having ¼ inch openings, the medium-sized pieces fit through a vibratory screen having ½ inch openings but were retained by a screen having ¼ inch openings, and the large-sized pieces were retained by a screen having ½ inch openings. Further, the muscle meat of the pulled pork product retained a fibrous appearance similar to pulled pork produced in the home.

It will be appreciated by those skilled in the art that other modifications to the foregoing preferred embodiments may be made in various aspects. The present invention is set forth with particularity in any appended claims. It is deemed that the spirit and scope of that invention encompasses such modifications and alterations to the preferred embodiments as would be apparent to one of ordinary skill in the art and familiar with the teachings of the present application.

The invention claimed is:

1. A method of mass-producing a home-style meat product having a non-uniform appearance, the method comprising:
providing boneless whole muscle meat;
combining the boneless whole muscle meat with a pickle solution having a low salt concentration having less than about 20% salt;
loosely stuffing the boneless whole muscle meat and the pickle solution having the low salt concentration into a casing, the loosely stuffed casing having void spaces intentionally introduced into the casing in between individual boneless whole muscle meats,
closing the loosely stuffed casings with the void spaces remaining in the closed, stuffed casings;
cooking the casing stuffed with the boneless whole muscle meat and the pickle solution having the low salt concentration wherein individual whole muscle meat pieces are bound together inside the casing during cooking; and
after the cooked boneless whole muscle meat has cooled, shredding the cooked boneless whole muscle meat to produce a home-style meat product wherein individual pieces of the home-style meat product are non-uniform in shape and display the natural structure of the cooked boneless whole muscle meat.

2. The method of claim 1 wherein the cooking of the casing stuffed with the boneless whole muscle meat and the pickle solution having the low salt concentration includes heating the boneless whole muscle meat and the mixture to a temperature in the range of approximately 160° F. to approximately 215° F.

3. The method of claim 1 wherein the cooking of the casing stuffed with the boneless whole muscle meat and the pickle solution having the low salt concentration includes reducing the weight of the combined boneless whole muscle meat and the pickle solution having the low salt concentration by approximately 10% to approximately 28%.

4. The method of claim 1 further comprising cooling the cooked boneless whole muscle meat to a temperature below 38° F. before pulling the cooked boneless whole muscle meat to produce the home-style meat product.

5. The method of claim 1 further comprising curing the combined boneless whole muscle meat and the pickle solution having a low salt concentration.

6. The method of claim 1 wherein the stuffing of the boneless whole muscle meat and the pickle solution having the low salt concentration into the casing includes using a stuffing horn configured to substantially preserve whole muscle characteristics of the boneless whole muscle meat.

7. The method of claim 1 wherein the pickle solution having a low salt concentration includes a salt concentration in the range of approximately 5% to approximately 15%.

8. The method of claim 1, wherein the pickle solution has a low phosphate concentration having less than approximately 2% phosphate.

9. The method of claim 8, wherein the pickle solution has approximately 1% to 2% phosphate.

10. The method of claim 1 further comprising before shredding the cooked boneless whole muscle meat, pressing the cooked boneless whole muscle meat.

* * * * *